United States Patent
Maruyama

(10) Patent No.: US 9,533,679 B2
(45) Date of Patent: Jan. 3, 2017

(54) HYBRID VEHICLE DRIVE CONTROL DEVICE

(75) Inventor: Tomoyuki Maruyama, Tajimi (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 7 days.

(21) Appl. No.: 14/387,799

(22) PCT Filed: Mar. 26, 2012

(86) PCT No.: PCT/JP2012/057812
§ 371 (c)(1),
(2), (4) Date: Sep. 24, 2014

(87) PCT Pub. No.: WO2013/145093
PCT Pub. Date: Oct. 3, 2013

(65) Prior Publication Data
US 2015/0014072 A1    Jan. 15, 2015

(51) Int. Cl.
*B60W 10/06* (2006.01)
*B60W 20/00* (2016.01)
(Continued)

(52) U.S. Cl.
CPC ............... *B60W 20/40* (2013.01); *B60K 6/26* (2013.01); *B60K 6/387* (2013.01); *B60K 6/442* (2013.01);
(Continued)

(58) Field of Classification Search
CPC .............................. B60W 10/06; B60W 10/08
(Continued)

(56) References Cited

U.S. PATENT DOCUMENTS 5,991,683 A * 11/1999 Takaoka ............... B60K 6/40
                                                          180/65.235
6,278,195 B1 * 8/2001 Yamaguchi ............ B60K 6/38
                                                          290/40 A
(Continued)

FOREIGN PATENT DOCUMENTS

JP        2005-199942 A      7/2005
JP        2008-49969 A       3/2008
(Continued)

OTHER PUBLICATIONS

International Search Report for PCT/JP2012/057812 dated Jun. 12, 2012 [PCT/ISA/210].

*Primary Examiner* — Jeffrey J Restifo
(74) *Attorney, Agent, or Firm* — Sughrue Mion, PLLC

(57) ABSTRACT

A drive control device for a hybrid vehicle is provided with a differential device including four rotary elements; and an engine, first and second electric motors and an output rotary member which are respectively connected to the four rotary elements. One of the four rotary elements is constituted by a rotary component of a first differential mechanism and a rotary component of a second differential mechanism selectively connected through a clutch, and one of the rotary components is selectively fixed to a stationary member through a brake. The drive control device comprises: an engine stop control portion configured to control the first and second electric motors so as to generate torques in respective opposite directions when the engine is required to be stopped during running of the hybrid vehicle in an engine drive mode in which the clutch is placed in an engaged state, the engine stop control portion reversing the directions of the torques generated by the first and second electric motors (Continued)

while the hybrid vehicle is in a coasting run, with respect to those generated while the hybrid vehicle is in a positive driving run.

4 Claims, 13 Drawing Sheets

(51) Int. Cl.
  *B60K 6/445* (2007.10)
  *B60W 10/08* (2006.01)
  *B60K 6/387* (2007.10)
  *B60K 6/26* (2007.10)
  *B60K 6/442* (2007.10)
  *B60K 17/02* (2006.01)
  *B60K 6/38* (2007.10)

(52) U.S. Cl.
  CPC ............... *B60K 6/445* (2013.01); *B60K 17/02* (2013.01); *B60W 10/06* (2013.01); *B60W 10/08* (2013.01); *B60K 2006/381* (2013.01); *Y02T 10/6239* (2013.01); *Y02T 10/6286* (2013.01); *Y02T 10/7258* (2013.01); *Y10S 903/915* (2013.01)

(58) Field of Classification Search
  USPC .......................... 180/65.265, 65.285, 65.28
  See application file for complete search history.

(56) References Cited

U.S. PATENT DOCUMENTS

| | | | | |
|---|---|---|---|---|
| 7,164,247 B2* | 1/2007 | Joe | .......................... | B60K 6/445 180/65.22 |
| 7,666,115 B2* | 2/2010 | Ito | .......................... | B60K 6/445 180/65.265 |
| 7,736,265 B2* | 6/2010 | Yamamoto | ............. | B60K 6/445 180/65.285 |
| 7,789,177 B2* | 9/2010 | Endo | ...................... | B60K 6/445 180/65.265 |
| 8,095,255 B2* | 1/2012 | Ebuchi | ................... | B60K 6/365 180/65.21 |
| 8,177,007 B2* | 5/2012 | Abe | ......................... | B60K 1/02 180/65.265 |
| 8,996,233 B2* | 3/2015 | Waku | ...................... | G06F 17/00 701/29.2 |
| 2001/0049570 A1* | 12/2001 | Yamaguchi | ............ | B60K 6/445 701/22 |
| 2003/0178953 A1* | 9/2003 | Tumback | ............... | B60K 6/365 318/8 |
| 2004/0152558 A1* | 8/2004 | Takami | ................... | B60K 6/485 477/3 |
| 2005/0119805 A1* | 6/2005 | Bischoff | .................. | B60K 6/48 701/22 |
| 2010/0121512 A1* | 5/2010 | Takahashi | .............. | B60K 6/365 701/22 |
| 2010/0137097 A1* | 6/2010 | Yim | ....................... | B60W 10/08 477/3 |
| 2010/0222949 A1* | 9/2010 | Muta | ........................ | B60K 6/40 701/22 |
| 2012/0270697 A1* | 10/2012 | Takami | ................... | B60K 6/387 477/5 |
| 2013/0296125 A1* | 11/2013 | Gibson | ................. | B60W 20/10 477/5 |
| 2013/0296132 A1* | 11/2013 | Doering | .................. | B60K 6/48 477/86 |
| 2014/0162835 A1* | 6/2014 | Gotoda | ................. | B60W 20/10 477/3 |
| 2014/0194238 A1* | 7/2014 | Ono | ........................ | B60K 6/445 475/5 |
| 2014/0336908 A1* | 11/2014 | Mori | .................... | F02N 11/0822 701/112 |
| 2015/0005125 A1* | 1/2015 | Hayashi | ................. | B60K 6/365 475/2 |
| 2015/0014072 A1* | 1/2015 | Maruyama | ............. | B60K 6/445 180/65.23 |
| 2015/0051769 A1* | 2/2015 | Maruyama | ............. | B60K 6/445 701/22 |
| 2015/0051770 A1* | 2/2015 | Hayashi | ................. | B60K 6/445 701/22 |
| 2015/0051773 A1* | 2/2015 | Hayashi | ................ | B60W 10/08 701/22 |
| 2015/0158484 A1* | 6/2015 | Sato | ........................ | B60K 6/445 701/22 |
| 2015/0166042 A1* | 6/2015 | Kitahata | ............... | B60W 10/12 477/3 |
| 2015/0183422 A1* | 7/2015 | Imamura | ................ | B60K 6/445 477/3 |
| 2015/0329105 A1* | 11/2015 | Matsui | ..................... | B60K 6/48 701/22 |
| 2015/0329119 A1* | 11/2015 | Sujan | .............. | B60W 30/18072 701/54 |
| 2015/0360682 A1* | 12/2015 | Ooshima | ................. | B60K 6/48 701/22 |
| 2016/0039404 A1* | 2/2016 | Tanaka | ................. | B60W 20/10 701/22 |

FOREIGN PATENT DOCUMENTS

| | | |
|---|---|---|
| JP | 2008-265600 A | 11/2008 |
| JP | 2009-220790 A | 10/2009 |
| WO | 2013/014777 A1 | 1/2013 |

* cited by examiner

|  | BK | CL | MODE |
|---|---|---|---|
| EV-1 | ○ |  | 1 |
| EV-2 | ○ | ○ | 2 |
| HV-1 | ○ |  | 3 |
| HV-2 |  | ○ | 4 |
| HV-3 |  |  | 5 |

HYBRID VEHICLE DRIVE CONTROL DEVICE

CROSS REFERENCE TO RELATED APPLICATIONS

This application is a National Stage of International Application No. PCT/JP2012/057812, filed on Mar. 26, 2012, the contents of all of which are incorporated herein by reference in their entirety.

TECHNICAL FIELD

The present invention relates to an improvement of a drive control device for a hybrid vehicle.

BACKGROUND ART

There is known a hybrid vehicle which is provided with a differential mechanism having a first rotary element connected to a first electric motor, a second rotary element connected to an engine, and a third rotary element connected to an output rotary member and a second electric motor, and a crankshaft locking device for inhibiting a rotary motion of a crankshaft of the engine, and which can run in an electric drive mode in which the first and second electric motors both are operated as a vehicle drive power source.

PRIOR ART DOCUMENT

Patent Document

Patent Document 1: JP-2008-265600 A1

SUMMARY OF THE INVENTION

Object Achieved by the Invention

In the above-described hybrid vehicle which is provided with the second electric motor a drive force of which can be transmitted directly to an output shaft or an output rotary member of a drive system, an influence of a reaction force generated by the first electric motor to rapidly stop a rotary motion of the engine during running of the hybrid vehicle in an engine drive mode, which influence exerts on a drive force of the hybrid vehicle, can be cancelled by an output torque of the second electric motor.

It is considered to configure a hybrid vehicle, for example, such that the hybrid vehicle is provided with: a first differential mechanism having a first rotary element connected to a first electric motor, a second rotary element connected to an engine, and a third rotary element connected to an output rotary member; a second differential mechanism having a first rotary element connected to a second electric motor, a second rotary element and a third rotary element, and in which one of the second and third rotary elements is connected to the third rotary element of the first differential mechanism; a clutch for selectively connecting the second rotary element of the first differential mechanism, and the other of the second and third rotary elements of the second differential mechanism not connected to the third rotary element of the first differential mechanism, to each other; and a brake for selectively fixing the above-indicated other of the second and third rotary elements of the second differential mechanism not connected to the third rotary element of the first differential mechanism, to a stationary member. This hybrid vehicle can be run in a second motor drive mode in which the first and second electric motors are operated to drive the hybrid vehicle while the brake and the clutch are placed in an engaged state, as well as in a first motor drive mode in which the second electric motor is primarily operated to drive the hybrid vehicle while the brake is placed in the engaged state.

In the hybrid vehicle having a plurality of drive modes described above, however, it is difficult for the first or second electric motor to cancel the influence, on the drive force of the hybrid vehicle, of the reaction force generated to stop the rotary motion of the engine in the drive mode in which the drive force of the second electric motor cannot be transmitted directly to the output rotary member of the drive system, since the second electric motor is connected to the rotary element that is different from the output rotary member.

The present invention was made in view of the background art described above. It is therefore an object of the present invention to provide a drive control device for a hybrid vehicle having a plurality of drive modes, which drive control device permits canceling of a reaction force generated to stop a rotary motion of the engine in an engine drive mode.

Means for Achieving the Object

The object indicated above is achieved according to the principle of the present invention, which provides a drive control device for a hybrid vehicle provided with (a) a first differential mechanism and a second differential mechanism which have four rotary elements as a whole; and an engine, a first electric motor, a second electric motor and an output rotary member which are respectively connected to the above-described four rotary elements, and wherein (b) one of the above-described four rotary elements is constituted by the rotary element of the above-described first differential mechanism and the rotary element of the above-described second differential mechanism which are selectively connected to each other through a clutch, and (c) one of the rotary elements of the above-described first and second differential mechanisms which are selectively connected to each other through the above-described clutch is selectively fixed to a stationary member through a brake, the drive control device being characterized by controlling the above-described first and second electric motors so as to generate torques in respective opposite directions when the engine is required to be stopped during running of the hybrid vehicle in an engine drive mode in which the above-described clutch is placed in an engaged state.

Advantages of the Invention

The drive control device of the present invention for the hybrid vehicle is configured to control the above-described first and second electric motors so as to generate torques in the respective opposite directions when the engine is required to be stopped during running of the hybrid vehicle in the engine drive mode in which the above-described clutch is placed in the engaged state. Accordingly, it is possible to prevent an influence of a reaction torque generated to stop a rotary motion of the engine, which influence would exert on drive wheels of the hybrid vehicle, when the engine is stopped during running of the hybrid vehicle in the engine drive mode in which the clutch is placed in the engaged state. Thus, it is possible to effectively prevent a variation of the vehicle drive force and a shock due to stopping of the rotary motion of the engine.

In one preferred form of the invention, the directions of the torques generated by the above-described first and second electric motors while the hybrid vehicle is in a coasting run are reversed with respect to those generated while the hybrid vehicle is in a positive driving run. According to this form of the invention, the hybrid vehicle in the coasting run can be decelerated with a regenerative operation of the second electric motor, while the hybrid vehicle in the positive driving run can be accelerated with a torque of the engine generated with a regenerative operation of the first electric motor, and a positive torque of the second electric motor.

In another preferred form of the invention, the above-described first electric motor is controlled to generate the torque in a positive direction, and the above-described second electric motor is controlled to generate the torque in a negative direction, while the hybrid vehicle is in the coasting run. According to this form of the invention, the hybrid vehicle in the coasting run can be decelerated with the regenerative operation of the second electric motor.

In a further preferred form of the invention, the above-described first electric motor is controlled to generate the torque in a negative direction, and the above-described second electric motor is controlled to generate the torque in a positive direction, while the hybrid vehicle is in the positive driving run. According to this form of the invention, the hybrid vehicle in the positive driving run can be accelerated with the torque of the engine generated with the regenerative operation of the first electric motor, and the positive torque of the second electric motor.

In a still further preferred form of the invention, the torque of the above-described first electric motor and the torque of the above-described second electric motor are controlled so as to prevent a variation of a drive force of the hybrid vehicle during running due to a reaction force generated to stop a rotary motion of the engine. According to this form of the invention, it is possible to prevent an influence of the reaction force generated to stop the rotary motion of the engine, which influence would exert on the drive wheels of the hybrid vehicle. Thus, it is possible to effectively prevent a variation of the vehicle drive force and a shock due to stopping of the rotary motion of the engine, in the coasting run or positive driving run of the hybrid vehicle.

In a yet further preferred form of the invention, a torque capacity of the above-described brake is increased to switch a vehicle drive mode to a motor drive mode in which the above-described brake is placed in an engaged state, and the torque of the above-described second electric motor is reduced with an increase of the torque capacity of the above-described brake. According to this form of the invention, it is possible to smoothly stop the rotary motion of the engine without reduction of the vehicle drive force in a terminal portion of an engaging action of the brake, and to reduce a shock upon reversal of the direction of the torque of the second electric motor during the engaging action of the brake.

In another preferred form of the invention, the direction of the torque of the above-described second electric motor is reversed when the torque capacity of the above-described brake has increased to a predetermined value. According to this form of the invention, the vehicle drive force can be generated at an earlier point of time or more smoothly, than where the direction of the torque of the second electric motor is reversed when the engine speed has been zeroed.

In still another preferred form of the invention, the reversal of the direction of the torque of the above-described second electric motor is implemented at an earlier point of time when a required vehicle drive force is relatively large than when the required vehicle drive force is relatively small. According to this form of the invention, it is possible to assure not only reduction of a variation of the vehicle drive force or a shock due to the reaction force generated to stop the rotary motion of the engine, but also an improvement of a response of the vehicle drive force.

In yet another preferred form of the invention, the above-described first differential mechanism is provided with a first rotary element connected to the above-described first electric motor, a second rotary element connected to the above-described engine, and a third rotary element connected to the above-described output rotary member, while the above-described second differential mechanism is provided with a first rotary element connected to the above-described second electric motor, a second rotary element, and a third rotary element, one of the second and third rotary elements being connected to the third rotary element of the above-described first differential mechanism, and the above-described clutch is configured to selectively connect the second rotary element of the above-described first differential mechanism, and the other of the second and third rotary elements of the above-described second differential mechanism which is not connected to the third rotary element of the above-described first differential mechanism, to each other, while the above-described brake is configured to selectively fix the other of the second and third rotary elements of the above-described second differential mechanism which is not connected to the third rotary element of the above-described first differential mechanism, to the stationary member. In the thus constructed hybrid vehicle drive system, the above-described first and second electric motors are controlled so as to generate torques in the respective opposite directions when the engine is required to be stopped during running of the hybrid vehicle in the engine drive mode in which the above-described clutch is placed in the engaged state. Accordingly, it is possible to prevent the influence of the reaction torque generated to stop the rotary motion of the engine, which influence would exert on the drive wheels of the hybrid vehicle, when the engine is stopped during running of the hybrid vehicle in the engine drive mode in which the clutch is placed in the engaged state. Thus, it is possible to effectively prevent a variation of the vehicle drive force and a shock due to stopping of the rotary motion of the engine.

MODE FOR CARRYING OUT THE INVENTION

Figure 1:
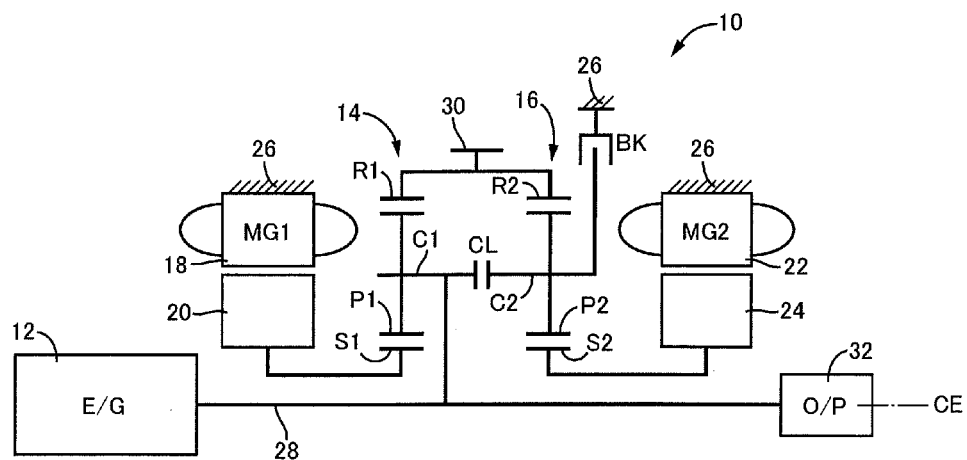
FIG. 1 is a schematic view for explaining an arrangement of a hybrid vehicle drive system to which the present invention is suitably applicable.

According to the present invention, the first and second differential mechanisms as a whole have four rotary elements while the above-described clutch is placed in the engaged state. In one preferred form of the present invention, the first and second differential mechanisms as a whole have four rotary elements while a plurality of clutches, each of which is provided between the rotary elements of the first and second differential mechanisms and which includes the above-described clutch, are placed in their engaged states. In other words, the present invention is suitably applicable to a drive control device for a hybrid vehicle which is provided with the first and second differential mechanisms represented as the four rotary elements indicated in a collinear chart, the engine, the first electric motor, the second electric motor and the output rotary member coupled to the respective four rotary elements, and wherein one of the four rotary elements is selectively connected through the above-described clutch to another of the rotary elements of the first differential mechanism and another of the rotary elements of the second differential mechanism, while the rotary element of the first or second differential mechanism to be selectively connected to the above-indicated one rotary element through the clutch is selectively fixed through the above-described brake to the stationary member.

In another preferred form of the present invention, the above-described clutch and brake are hydraulically operated coupling devices operating states (engaged and released states) of which are controlled according to a hydraulic pressure. While wet multiple-disc type frictional coupling devices are preferably used as the clutch and brake, meshing type coupling devices, namely, so-called dog clutches (claw clutches) may also be used. Alternatively, the clutch and brake may be electromagnetic clutches, magnetic powder clutches and any other clutches the operating states of which are controlled (which are engaged and released) according to electric commands.

The drive system to which the present invention is applicable is placed in a selected one of a plurality of drive modes, depending upon the operating states of the above-described clutch and brake. Preferably, EV drive modes in which at least one of the above-described first and second electric motors is used as a vehicle drive power source with the engine stopped include an EV-1 mode to be established in the engaged state of the brake and in the released state of the clutch, and an EV-2 mode to be established in the engaged states of both of the clutch and brake. Further, hybrid drive modes in which the above-described engine is operated while the above-described first and second electric motors are operated to generate a vehicle drive force and/or an electric energy as needed, include an HV-1 mode to be established in the engaged state of the brake and in the released state of the clutch, an HV-2 mode to be established in the released state of the brake and the engaged state of the clutch, and an HV-3 mode to be established in the released states of both of the brake and clutch.

In a further preferred form of the invention, the rotary elements of the above-described first differential mechanism, and the rotary elements of the above-described second differential mechanism are arranged as seen in the collinear charts, in the engaged state of the above-described clutch and in the released state of the above-described brake, in the order of the first rotary element of the first differential mechanism, the first rotary element of the second differential mechanism, the second rotary element of the first differential mechanism, the second rotary element of the second differential mechanism, the third rotary element of the first differential mechanism, and the third rotary element of the second differential mechanism, where the rotating speeds of the second rotary elements and the third rotary elements of the first and second differential mechanisms are indicated in mutually overlapping states in the collinear charts. This form of the invention provides a hybrid vehicle drive system having a highly practical arrangement.

Referring to the drawings, preferred embodiments of the present invention will be described in detail. It is to be understood that the drawings referred to below do not necessarily accurately represent ratios of dimensions of various elements.

First Embodiment

FIG. 1 is the schematic view for explaining an arrangement of a hybrid vehicle drive system 10 (hereinafter referred to simply as a "drive system 10") to which the present invention is suitably applicable. As shown in FIG. 1, the drive system 10 according to the present embodiment is of a transversely installed type suitably used for an FF (front-engine front-drive) type vehicle, and is provided with a main vehicle drive power source in the form of an engine 12, a first electric motor MG1, a second electric motor MG2, a first differential mechanism in the form of a first planetary gear set 14, and a second differential mechanism in the form of a second planetary gear set 16, which are disposed on a common center axis CE. The drive system 10 is constructed substantially symmetrically with respect to the center axis CE. In FIG. 1, a lower half of the drive system 10 is not shown. This description applies to other embodiments which will be described.

The engine 12 is an internal combustion engine such as a gasoline engine, which is operable to generate a drive force by combustion of a fuel such as a gasoline injected into its cylinders. Each of the first electric motor MG1 and second electric motor MG2 is a so-called motor/generator having a function of a motor operable to generate a drive force, and a function of an electric generator operable to generate a reaction force, and is provided with a stator 18, 22 fixed to a stationary member in the form of a housing (casing) 26, and a rotor 20, 24 disposed radially inwardly of the stator 18, 22.

The first planetary gear set 14 is a single-pinion type planetary gear set which has a gear ratio $\rho 1$ and which is provided with rotary elements (elements) consisting of: a first rotary element in the form of a sun gear S1; a second rotary element in the form of a carrier C1 supporting a pinion gear P1 such that the pinion gear P1 is rotatable about its axis and the axis of the planetary gear set; and a third rotary element in the form of a ring gear R1 meshing with the sun gear S1 through the pinion gear P1. The second planetary gear set 16 is a single-pinion type planetary gear set which has a gear ratio $\rho 2$ and which is provided with rotary elements (elements) consisting of: a first rotary element in the form of a sun gear S2; a second rotary element in the form of a carrier C2 supporting a pinion gear P2 such that the pinion gear P2 is rotatable about its axis and the axis of the planetary gear set; and a third rotary element in the form of a ring gear R2 meshing with the sun gear S2 through the pinion gear P2.

The sun gear S1 of the first planetary gear set 14 is connected to the rotor 20 of the first electric motor MG1. The carrier C1 of the first planetary gear set 14 is connected to an input shaft 28 which is rotated integrally with a crankshaft of the engine 12. This input shaft 28 is rotated about the center axis CE. In the following description, the direction of extension of this center axis CE will be referred to as an "axial direction", unless otherwise specified. The ring gear R1 of the first planetary gear set 14 is connected to an output rotary member in the form of an output gear 30, and to the ring gear R2 of the second planetary gear set 16. The sun gear S2 of the second planetary gear set 16 is connected to the rotor 24 of the second electric motor MG2.

The drive force received by the output gear 30 is transmitted to a pair of left and right drive wheels (not shown) through a differential gear device not shown and axles not shown. On the other hand, a torque received by the drive wheels from a roadway surface on which the vehicle is running is transmitted (input) to the output gear 30 through the differential gear device and axles, and to the drive system 10. A mechanical oil pump 32, which is a vane pump, for instance, is connected to one of opposite end portions of the input shaft 28, which one end portion is remote from the engine 12. The oil pump 32 is operated by the engine 12, to generate a hydraulic pressure to be applied to a hydraulic control unit 60, etc. which will be described. An electrically operated oil pump which is operated with an electric energy may be provided in addition to the oil pump 32.

Between the carrier C1 of the first planetary gear set 14 and the carrier C2 of the second planetary gear set 16, there is disposed a clutch CL which is configured to selectively couple these carriers C1 and C2 to each other (to selectively connect the carriers C1 and C2 to each other or disconnect the carriers C1 and C2 from each other). Between the carrier C2 of the second planetary gear set 16 and the stationary member in the form of the housing 26, there is disposed a brake BK which is configured to selectively couple (fix) the carrier C2 to the housing 26. Each of these clutch CL and brake BK is a hydraulically operated coupling device the operating state of which is controlled (which is engaged and released) according to the hydraulic pressure applied thereto from the hydraulic control unit 60. While wet multiple-disc type frictional coupling devices are preferably used as the clutch CL and brake BK, meshing type coupling devices, namely, so-called dog clutches (claw clutches) may also be used. Alternatively, the clutch CL and brake BK may be electromagnetic clutches, magnetic powder clutches and any other clutches the operating states of which are controlled (which are engaged and released) according to electric commands generated from an electronic control device 40.

As shown in FIG. 1, the drive system 10 is configured such that the first planetary gear set 14 and second planetary gear set 16 are disposed coaxially with the input shaft 28 (disposed on the center axis CE), and opposed to each other in the axial direction of the center axis CE. Namely, the first planetary gear set 14 is disposed on one side of the second planetary gear set 16 on a side of the engine 12, in the axial direction of the center axis CE. The first electric motor MG1 is disposed on one side of the first planetary gear set 14 on the side of the engine 12, in the axial direction of the center axis CE. The second electric motor MG2 is disposed on one side of the second planetary gear set 16 which is remote from the engine 12, in the axial direction of the center axis CE. Namely, the first electric motor MG1 and second electric motor MG2 are opposed to each other in the axial direction of the center axis CE, such that the first planetary gear set 14 and second planetary gear set 16 are interposed between the first electric motor MG1 and second electric motor MG2. That is, the drive system 10 is configured such that the first electric motor MG1, first planetary gear set 14, clutch CL, second planetary gear set 16, brake BK and second electric motor MG2 are disposed coaxially with each other, in the order of description from the side of the engine 12, in the axial direction of the center axis CE.

Figure 2:
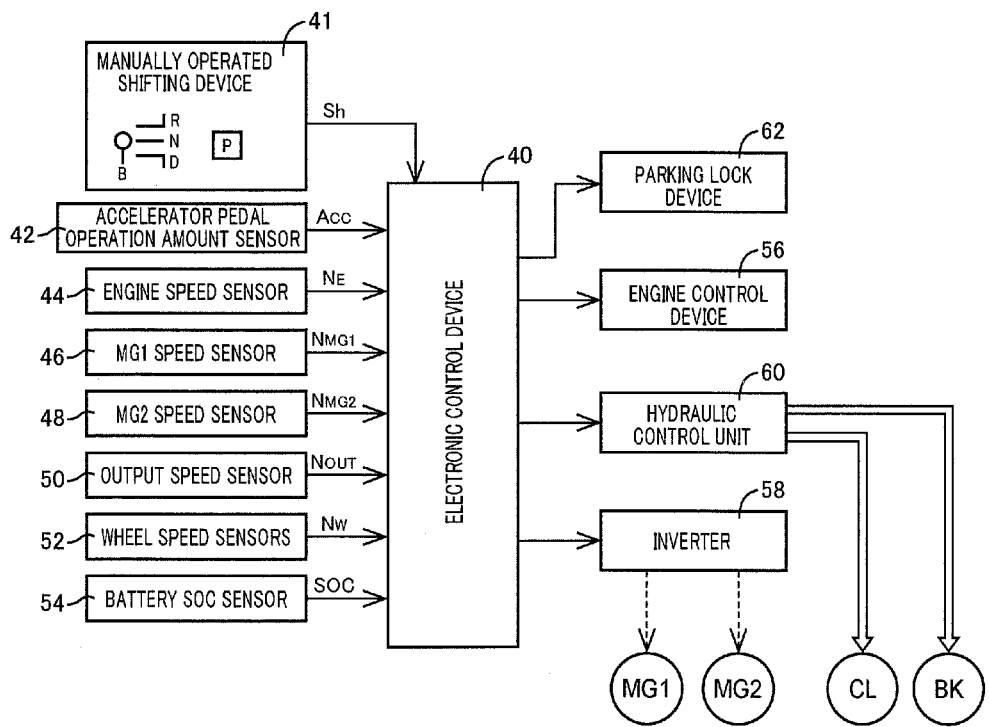
FIG. 2 is a view for explaining major portions of a control system provided to control the drive system of FIG. 1.

FIG. 2 is the view for explaining major portions of a control system provided to control the drive system 10. The electronic control device 40 shown in FIG. 2 is a so-called microcomputer which incorporates a CPU, a ROM, a RAM and an input-output interface and which is operable to perform signal processing operations according to programs stored in the ROM while utilizing a temporary data storage function of the RAM, to implement various drive controls of the drive system 10, such as a drive control of the engine 12 and hybrid drive controls of the first electric motor MG1 and second electric motor MG2. In the present embodiment, the electronic control device 40 corresponds to a drive control device for a hybrid vehicle having the drive system 10. The electronic control device 40 may be constituted by mutually independent control units as needed for respective controls such as an output control of the engine 12 and drive controls of the first electric motor MG1 and second electric motor MG2.

As indicated in FIG. 2, the electronic control device 40 is configured to receive various signals from sensors and switches provided in the drive system 10. Namely, the electronic control device 40 receives: a shift position signal Sh generated by a manually operated shifting device 41, which is indicative of a presently selected one of a parking position, a neutral position, a forward drive position, a reverse drive position, etc.; an output signal of an accelerator pedal operation amount sensor 42 indicative of an operation amount or angle $A_{CC}$(%) of an accelerator pedal (not shown), which corresponds to a vehicle output required by a vehicle operator; an output signal of an engine speed sensor 44 indicative of an engine speed $N_E$ (r.p.m), that is, an operating speed of the engine 12; an output signal of an MG1 speed sensor 46 indicative of an operating speed $N_{MG1}$ (r.p.m) of the first electric motor MG1; an output signal of an MG2 speed sensor 48 indicative of an operating speed $N_{MG2}$ (r.p.m) of the second electric motor MG2; an output signal of an output speed sensor 50 indicative of a rotating speed $N_{OUT}$ (r.p.m) of the output gear 30, which corresponds to a running speed V of the vehicle; an output signal of wheel speed sensors 52 indicative of rotating speeds $N_W$ (r.p.m) of wheels in the drive system 10; and an output signal of a battery SOC sensor 54 indicative of a stored electric energy amount (state of charge) SOC (%) of a battery not shown.

The electronic control device 40 is also configured to generate various control commands to be applied to various portions of the drive system 10. Namely, the electronic control device 40 applies to an engine control device 56 for controlling an output of the engine 12, following engine output control commands for controlling the output of the engine 12, which commands include: a fuel injection amount control signal to control an amount of injection of a fuel by a fuel injecting device into an intake pipe; an ignition control signal to control a timing of ignition of the engine 12 by an igniting device; and an electronic throttle valve drive control signal to control a throttle actuator for controlling an opening angle $\theta_{TH}$ of an electronic throttle valve. Further, the electronic control device 40 applies command signals to an inverter 58, for controlling operations of the first electric motor MG1 and second electric motor MG2, so that the first and second electric motors MG1 and MG2 are operated with electric energies supplied thereto from a battery through the inverter 58 according to the command signals to control outputs (output torques) of the electric motors MG1 and MG2. Electric energies generated by the first and second electric motors MG1 and MG2 are supplied to and stored in the battery through the inverter 58. Further, the electronic control device 40 applies command signals for controlling the operating states of the clutch CL and brake BK, to linear solenoid valves and other electromagnetic control valves provided in the hydraulic control unit 60, so that hydraulic pressures generated by those electromagnetic control valves are controlled to control the operating states of the clutch CL and brake BK. When the electronic control device 40 receives the shift position signal Sh indicative of the presently selected parking position, the electronic control device 40 applies to a parking lock device 62 a command signal for inhibiting a rotary motion of the output gear 30.

An operating state of the drive system 10 is controlled through the first electric motor MG1 and second electric motor MG2, such that the drive system 10 functions as an electrically controlled differential portion whose difference of input and output speeds is controllable. For example, an electric energy generated by the first electric motor MG1 is supplied to the battery or the second electric motor MG2 through the inverter 58. Namely, a major portion of the drive force of the engine 12 is mechanically transmitted to the output gear 30, while the remaining portion of the drive force is consumed by the first electric motor MG1 operating as the electric generator, and converted into the electric energy, which is supplied to the second electric motor MG2 through the inverter 58, so that the second electric motor MG2 is operated to generate a drive force to be transmitted to the output gear 30. Components associated with the generation of the electric energy and the consumption of the generated electric energy by the second electric motor MG2 constitute an electric path through which a portion of the drive force of the engine 12 is converted into an electric energy which is converted into a mechanical energy.

Figures 3, 4:
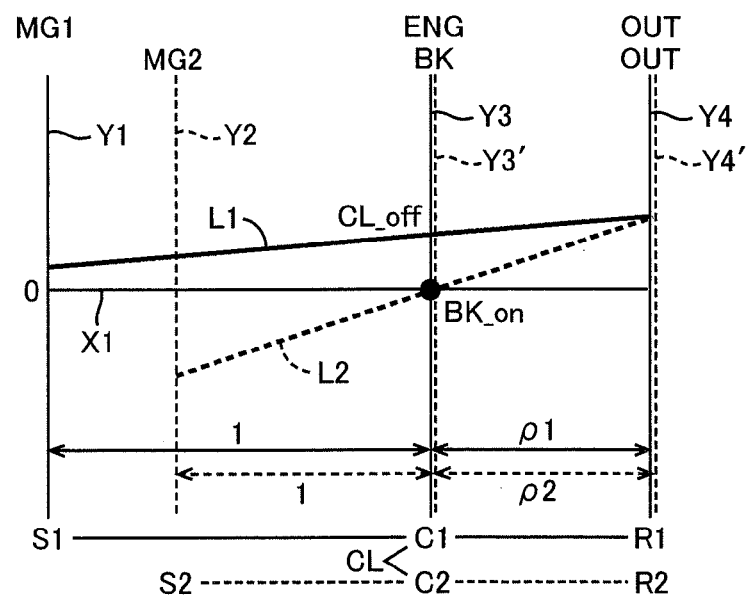
FIG. 3 is a table indicating combinations of operating states of a clutch and a brake, which correspond to respective five drive modes of the drive system of FIG. 1.
FIG. 4 is a collinear chart having straight lines which permit indication thereon of relative rotating speeds of various rotary elements of the drive system of FIG. 1, the collinear chart corresponding to the EV-1 mode and HV-1 mode of FIG. 3.

In the hybrid vehicle provided with the drive system 10 constructed as described above, one of a plurality of drive modes is selectively established according to the operating states of the engine 12, first electric motor MG1 and second electric motor MG2, and the operating states of the clutch CL and brake BK. FIG. 3 is the table indicating combinations of the operating states of the clutch CL and brake BK, which correspond to the respective five drive modes of the drive system 10. In this table, "o" marks represent an engaged state while blanks represent a released state. The EV-1 and EV-2 modes indicated in FIG. 3 are EV chive modes in which the engine 12 is held at rest while at least one of the first electric motor MG1 and second electric motor MG2 is used as a vehicle drive power source. The HV-1, HV-2 and HV-3 modes are hybrid drive modes (engine drive modes) in which the engine 12 is operated as the vehicle drive power source while the first electric motor MG1 and second electric motor MG2 are operated as needed to generate a vehicle drive force and/or an electric energy. In these hybrid drive modes, at least one of the first electric motor MG1 and second electric motor MG2 is operated to generate a reaction force or placed in a non-load free state.

As is apparent from FIG. 3, the EV drive modes of the drive system 10 in which the engine 12 is held at rest while at least one of the first electric motor MG1 and second electric motor MG2 is used as the vehicle chive power source consist of: the EV-1 mode (mode 1) which is established in the engaged state of the brake BK and in the released state of the clutch CL; and the EV-2 mode (mode 2) which is established in the engaged states of both of the brake BK and clutch CL. The hybrid drive modes in which the engine 12 is operated as the vehicle drive power source while the first electric motor MG1 and second electric motor MG2 are operated as needed to generate a vehicle drive force and/or an electric energy, consist of: the HV-1 mode (mode 3) which is established in the engaged state of the brake BK and in the released state of the clutch CL; the HV-2 mode (mode 4) which is established in the released state of the brake BK and in the engaged state of the clutch CL; and the HV-3 mode (mode 5) in the form of the drive mode HV-3 which is established in the released states of both of the brake BK and clutch CL.

FIGS. 4-7 are the collinear charts having straight lines which permit indication thereon of relative rotating speeds of the various rotary elements of the drive system 10 (first planetary gear set 14 and second planetary gear set 16), which rotary elements are connected to each other in different manners corresponding to respective combinations of the operating states of the clutch CL and brake BK. These collinear charts are defined in a two-dimensional coordinate system having a horizontal axis along which relative gear ratios ρ of the first and second planetary gear sets 14 and 16 are taken, and a vertical axis along which the relative rotating speeds are taken. The collinear charts indicate the relative rotating speeds when the output gear 30 is rotated in the positive direction to drive the hybrid vehicle in the forward direction. A horizontal line X1 represents the rotating speed of zero, while vertical lines Y1 through Y4 arranged in the order of description in the rightward direction represent the respective relative rotating speeds of the sun gear S1, sun gear S2, carrier C1 and ring gear R1. Namely, a solid line Y1 represents the relative rotating speed of the sun gear S1 of the first planetary gear set 14 (operating speed of the first electric motor MG1), a broken line Y2 represents the relative rotating speed of the sun gear S2 of the second planetary gear set 16 (operating speed of the second electric motor MG2), a solid line Y3 represents the relative rotating speed of the carrier C1 of the first planetary gear set 14 (operating speed of the engine 12), a broken line Y3' represents the relative rotating speed of the carrier C2 of the second planetary gear set 16, a solid line Y4 represents the relative rotating speed of the ring gear R1 of the first planetary gear set 14 (rotating speed of the output gear 30), and a broken line Y4' represents the relative rotating speed of the ring gear R2 of the second planetary gear set 16. In FIGS. 4-7, the vertical lines Y3 and Y3' are superimposed on each other, while the vertical lines Y4 and Y4' are superimposed on each other. Since the ring gears R1 and R2 are fixed to each other, the relative rotating speeds of the ring gears R1 and R2 represented by the vertical lines Y4 and Y4' are equal to each other.

In FIGS. 4-7, a solid line L1 represents the relative rotating speeds of the three rotary elements of the first planetary gear set 14, while a broken line L2 represents the relative rotating speeds of the three rotary elements of the second planetary gear set 16. Distances between the four vertical lines Y1-Y4 (Y2-Y4') corresponding to four rotary elements of the first and second planetary gear sets 14 and 16 taken as a whole are determined by the gear ratios ρ1 and ρ2 of the first and second planetary gear sets 14 and 16. Described more specifically, regarding the vertical lines Y1, Y3 and Y4 corresponding to the respective three rotary elements in the form of the sun gear S1, carrier C1 and ring gear R1 of the first planetary gear set 14, a distance between the vertical lines Y1 and Y3 corresponds to "1", while a distance between the vertical lines Y3 and Y4 corresponds to the gear ratio "ρ1". Regarding the vertical lines Y2, Y3' and Y4' corresponding to the respective three rotary elements in the form of the sun gear S2, carrier C2 and ring gear R2 of the second planetary gear set 16, a distance between the vertical lines Y2 and Y3' corresponds to "1", while a distance between the vertical lines Y3' and Y4' corresponds to the gear ratio "ρ2". In the drive system 10, the gear ratio ρ2 of the second planetary gear set 16 is higher than the gear ratio ρ1 of the first planetary gear set 14 (ρ2>ρ1). The drive modes of the drive system 10 will be described by reference to FIGS. 4-7.

The EV-1 mode (mode 1) indicated in FIG. 3 is preferably a first motor drive mode in which the engine 12 is held at rest while the second electric motor MG2 is used as the vehicle drive power source. FIG. 4 is the collinear chart corresponding to this EV-1 mode. Described by reference to this collinear chart, the carrier C1 of the first planetary gear set 14 and the carrier C2 of the second planetary gear set 16 are rotatable relative to each other in the released state of the clutch CL. In the engaged state of the brake BK, the carrier C2 of the second planetary gear set 16 is coupled (fixed) to the stationary member in the form of the housing 26, so that the rotating speed of the carrier C2 is held zero. In this EV-1 mode, the rotating direction of the sun gear S2 and the rotating direction of the ring gear R2 in the second planetary gear set 16 are opposite to each other, so that when the second electric motor MG2 is operated to generate a negative torque (acting in the negative direction), the ring gear R2, that is, the output gear 30 is rotated in the positive direction by the generated negative torque. Namely, the hybrid vehicle provided with the drive system 10 is driven in the forward direction when the negative torque is generated by the second electric motor MG2. In this case, the first electric motor MG1 is preferably held in a free state. In this EV-1 mode, the carriers C1 and C2 are permitted to be rotated relative to each other, so that the hybrid vehicle can be driven in the EV drive mode in which running using the second electric motor MG2 in forward and backward direction can be performed, similar to an EV (electric) drive mode which is established in a vehicle provided with a so-called "THS" (Toyota Hybrid System) and in which the clutch carrier C2 is fixed to the stationary member.

Figure 5:
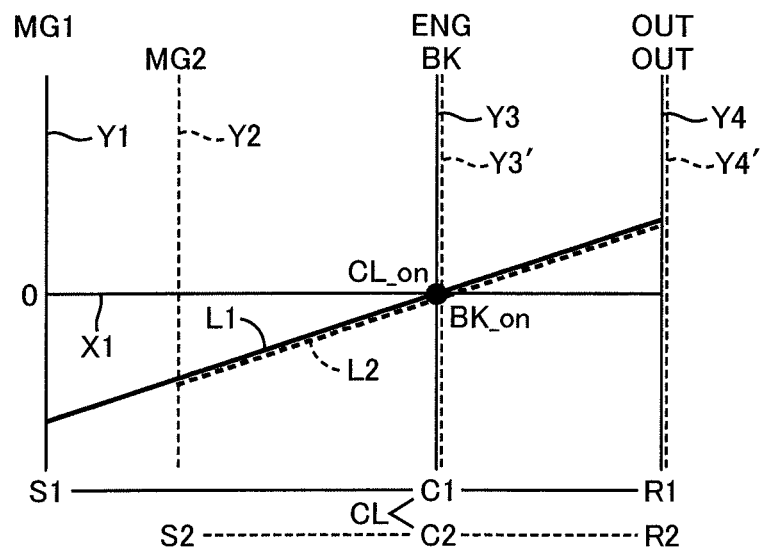
FIG. 5 is a collinear chart having straight lines which permit indication thereon of relative rotating speeds of various rotary elements of the drive system of FIG. 1, the collinear chart corresponding to the EV-2 mode of FIG. 3.

The EV-2 mode (mode 2) indicated in FIG. 3 is preferably a second motor drive mode in which the engine 12 is held at rest while at least one of the first electric motor MG1 and second electric motor MG2 is used as the vehicle drive power source. FIG. 5 is the collinear chart corresponding to this EV-2 mode. Described by reference to this collinear chart, the carrier C1 of the first planetary gear set 14 and the carrier C2 of the second planetary gear set 16 are not rotatable relative to each other in the engaged state of the clutch CL. Further, in the engaged state of the brake BK, the carrier C2 of the second planetary gear set 16 and the carrier C1 of the first planetary gear set 14 which is connected to the carrier C2 are coupled (fixed) to the stationary member in the form of the housing 26, so that the rotating speeds of the carriers C1 and C2 are held zero. In this EV-2 mode, the rotating direction of the sun gear S1 and the rotating direction of the ring gear R1 in the first planetary gear set 14 are opposite to each other, and the rotating direction of the sun gear S2 and the rotating direction of the ring gear R2 in the second planetary gear set 16 are opposite to each other, so that when the first electric motor MG1 and/or second electric motor MG2 is/are operated to generate a negative torque (acting in the negative direction), the ring gears R1 and R2 are rotated, that is, the output gear 30 is rotated in the positive direction by the generated negative torque. Namely, the hybrid vehicle provided with the drive system 10 can be driven in the forward or reverse direction by at least one of the first electric motor MG1 and second electric motor MG2.

In the EV-2 mode, at least one of the first electric motor MG1 and second electric motor MG2 may be operated as the electric generator. In this case, one or both of the first and second electric motors MG1 and MG2 may be operated to generate a vehicle drive force (torque), at an operating point assuring a relatively high degree of operating efficiency, and/or with a reduced degree of torque limitation due to heat generation. Further, at least one of the first and second electric motors MG1 and MG2 may be held in a free state, when the generation of an electric energy by a regenerative operation of the electric motors MG1 and MG2 is inhibited due to full charging of the battery. Namely, the EV-2 mode is an EV drive mode which may be established under various running conditions of the hybrid vehicle, or may be kept for a relatively long length of time. Accordingly, the EV-2 mode is advantageously provided on a hybrid vehicle such as a plug-in hybrid vehicle, which is frequently placed in an EV drive mode.

The HV-1 mode (mode 3) indicated in FIG. 3 is preferably a first hybrid drive mode (first engine drive mode) in which the engine 12 is used as the vehicle drive power source while the first electric motor MG1 and second electric motor MG2 are operated as needed to generate a vehicle drive force and/or an electric energy. FIG. 4 is the collinear chart corresponding to this HV-1 mode. Described by reference to this collinear chart, the carrier C1 of the first planetary gear set 14 and the carrier C2 of the second planetary gear set 16 are rotatable relative to each other, in the released state of the clutch CL. In the engaged state of the brake BK, the carrier C2 of the second planetary gear set 16 is coupled (fixed) to the stationary member in the form of the housing 26, so that the rotating speed of the carrier C2 is held zero. In this HV-1 mode, the engine 12 is operated to generate an output torque by which the output gear 30 is rotated. At this time, the first electric motor MG1 is operated to generate a reaction torque in the first planetary gear set 14, so that the output of the engine 12 can be transmitted to the output gear 30. In the second planetary gear set 16, the rotating direction of the sun gear S2 and the rotating direction of the ring gear R2 are opposite to each other, in the engaged state of the brake BK, so that when the second electric motor MG2 is operated to generate a negative torque (acting in the negative direction), the ring gears R1 and R2 are rotated, that is, the output gear 30 is rotated in the positive direction by the generated negative torque.

Figure 6:
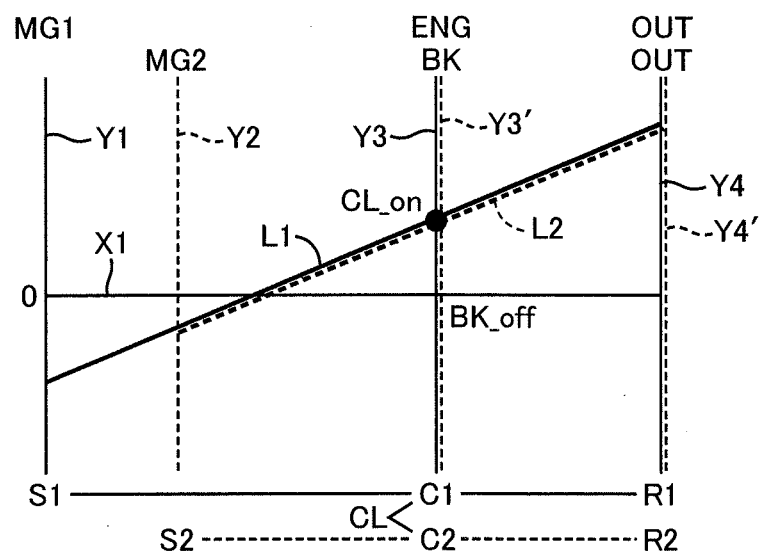
FIG. 6 is a collinear chart having straight lines which permit indication thereon of relative rotating speeds of various rotary elements of the drive system of FIG. 1, the collinear chart corresponding to the HV-2 mode of FIG. 3.

The HV-2 mode (mode 4) indicated in FIG. 3 is preferably a second hybrid drive mode (second engine drive mode) in which the engine 12 is used as the vehicle drive power source while the first electric motor MG1 and second electric motor MG2 are operated as needed to generate a vehicle drive force and/or an electric energy. FIG. 6 is the collinear chart corresponding to this HV-2 mode. Described by reference to this collinear chart, the carrier C1 of the first planetary gear set 14 and the carrier C2 of the second planetary gear set 16 are not rotatable relative to each other, in the engaged state of the clutch CL, that is, the carriers C1 and C2 are integrally rotated as a single rotary element. The ring gears R1 and R2, which are fixed to each other, are integrally rotated as a single rotary element. Namely, in the HV-2 mode of the drive system 10, the first planetary gear set 14 and second planetary gear set 16 function as a differential mechanism having a total of four rotary elements. That is, the HV-2 mode is a composite split mode in which the four rotary elements consisting of the sun gear S1 (connected to the first electric motor MG1), the sun gear S2 (connected to the second electric motor MG2), the rotary element constituted by the carriers C1 and C2 connected to each other (and to the engine 12), and the rotary element constituted by the ring gears R1 and R2 fixed to each other (and connected to the output gear 30) are connected to each other in the order of description in the rightward direction as seen in FIG. 6.

In the HV-2 mode, the rotary elements of the first planetary gear set 14 and second planetary gear set 16 are preferably arranged as indicated in the collinear chart of FIG. 6, that is, in the order of the sun gear S1 represented by the vertical line Y1, the sun gear S2 represented by the vertical line Y2, the carriers C1 and C2 represented by the vertical line Y3 (Y3'), and the ring gears R1 and R2 represented by the vertical line Y4 (Y4'). The gear ratios $\rho1$ and $\rho2$ of the first and second planetary gear sets 14 and 16 are determined such that the vertical line Y1 corresponding to the sun gear S1 and the vertical line Y2 corresponding to the sun gear S2 are positioned as indicated in the collinear chart of FIG. 6, namely, such that the distance between the vertical lines Y1 and Y3 is longer than the distance between the vertical lines Y2 and Y3'. In other words, the distance between the vertical lines corresponding to the sun gear S1 and the carrier C1 and the distance between the vertical lines corresponding to the sun gear S2 and the carrier C2 correspond to "1", while the distance between the vertical lines corresponding to the carrier C1 and the ring gear R1 and the distance between the vertical lines corresponding to the carrier C2 and the ring gear R2 correspond to the respective gear ratios $\rho1$ and $\rho2$. Accordingly, the drive system 10 is configured such that the gear ratio $\rho2$ of the second planetary gear set 16 is higher than the gear ratio $\rho1$ of the first planetary gear set 14.

In the HV-2 mode, the carrier C1 of the first planetary gear set 14 and the carrier C2 of the second planetary gear set 16 are connected to each other in the engaged state of the clutch CL, so that the carriers C1 and C2 are rotated integrally with each other. Accordingly, either one or both of the first electric motor MG1 and second electric motor MG2 can receive a reaction force corresponding to the output of the engine 12. Namely, one or both of the first and second electric motors MG1 and MG2 can be operated to receive the reaction force during an operation of the engine 12, so that each of the first and second electric motors MG1 and MG2 can be operated at an operating point assuring a relatively high degree of operating efficiency, and/or with a reduced degree of torque limitation due to heat generation. For example, one of the first electric motor MG1 and second electric motor MG2 which is operable with a higher degree of operating efficiency is preferentially operated to generate a reaction force, so that the overall operating efficiency can be improved. Further, where there is a torque limitation of one of the first electric motor MG1 and second electric motor MG2 due to heat generation, it is possible to ensure the generation of the reaction force required for the engine 12, by controlling the other electric motor so as to perform a regenerative operation or a vehicle driving operation, for providing an assisting vehicle driving force.

Figure 7:
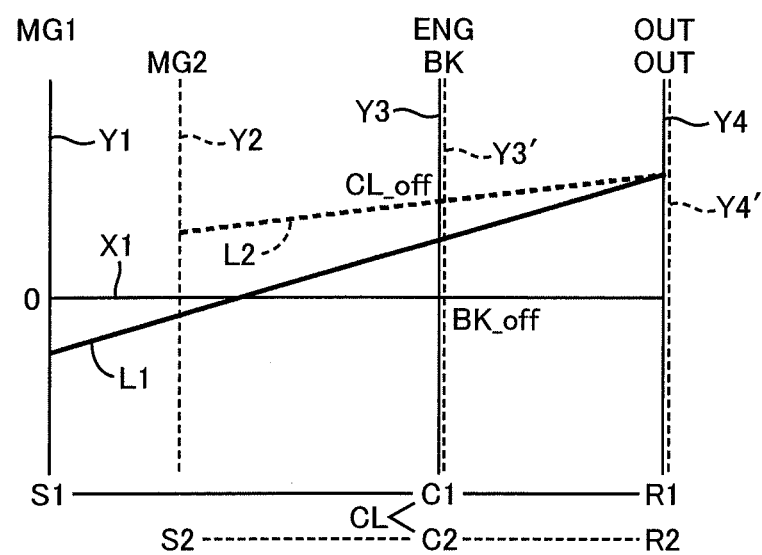
FIG. 7 is a collinear chart having straight lines which permit indication thereon of relative rotating speeds of various rotary elements of the drive system of FIG. 1, the collinear chart corresponding to the HV-3 mode of FIG. 3.

The HV-3 mode (mode 5) indicated in FIG. 3 is preferably a third hybrid drive mode (third engine drive mode) in which the engine 12 is operated as the vehicle drive power source while the first electric motor MG1 is operated to generate an electric energy, with a continuous change of the speed ratio, and with an operating point of the engine 12 being moved along a predetermined optimum operating curve. In this HV-3 mode, the engine 12 and first electric motor MG1 may be operated to generate a vehicle drive force, with the second electric motor MG2 being disconnected from a drive system. FIG. 7 is the collinear chart corresponding to this HV-3 mode. Described by reference to this collinear chart, the carrier C1 of the first planetary gear set 14 and the carrier C2 of the second planetary gear set 16 are rotatable relative to each other in the released state of the clutch CL. In the released state of the brake BK, the carrier C2 of the second planetary gear set 16 is rotatable relative to the stationary member in the form of the housing 26. In this arrangement, the second electric motor MG2 can be held at rest while it is disconnected from the drive system (power transmitting path).

In the HV-3 mode in which the brake BK is placed in the engaged state, the second electric motor MG2 is kept in an operated state together with a rotary motion of the output gear 30 (ring gear R2) during running of the vehicle. In this operating state, the operating speed of the second electric motor MG2 may reach an upper limit value (upper limit) during running of the vehicle at a comparatively high speed, or a rotary motion of the ring gear 112 at a high speed is transmitted to the sun gear S2. In this respect, it is not necessarily desirable to keep the second electric motor MG2 in the operated state during running of the vehicle at a comparatively high speed, from the standpoint of the operating efficiency. In the HV-3 mode, on the other hand, the engine 12 and the first electric motor MG1 may be operated to generate the vehicle drive force during running of the vehicle at the comparatively high speed, while the second electric motor MG2 is disconnected from the drive system, so that it is possible to reduce a power loss due to dragging of the unnecessarily operated second electric motor MG2, and to eliminate a limitation of the highest vehicle running speed corresponding to the permissible highest operating speed (upper limit of the operating speed) of the second electric motor MG2.

It will be understood from the foregoing description, the drive system 10 is selectively placed in one of the three hybrid drive modes in which the engine 12 is operated as the vehicle drive power source while the first and second electric motors MG1 and MG2 are operated as needed to generate a vehicle drive force and/or an electric energy, namely, in one of the HV-1 mode, HV-2 mode and HV-3 mode, which are selectively established by respective combinations of the engaged and released states of the clutch CL and brake BK. Accordingly, the transmission efficiency can be improved to improve the fuel economy of the vehicle, by selectively establishing one of the three hybrid drive modes according to the vehicle running speed and the speed ratio, in which the transmission efficiency is the highest.

Figure 8:
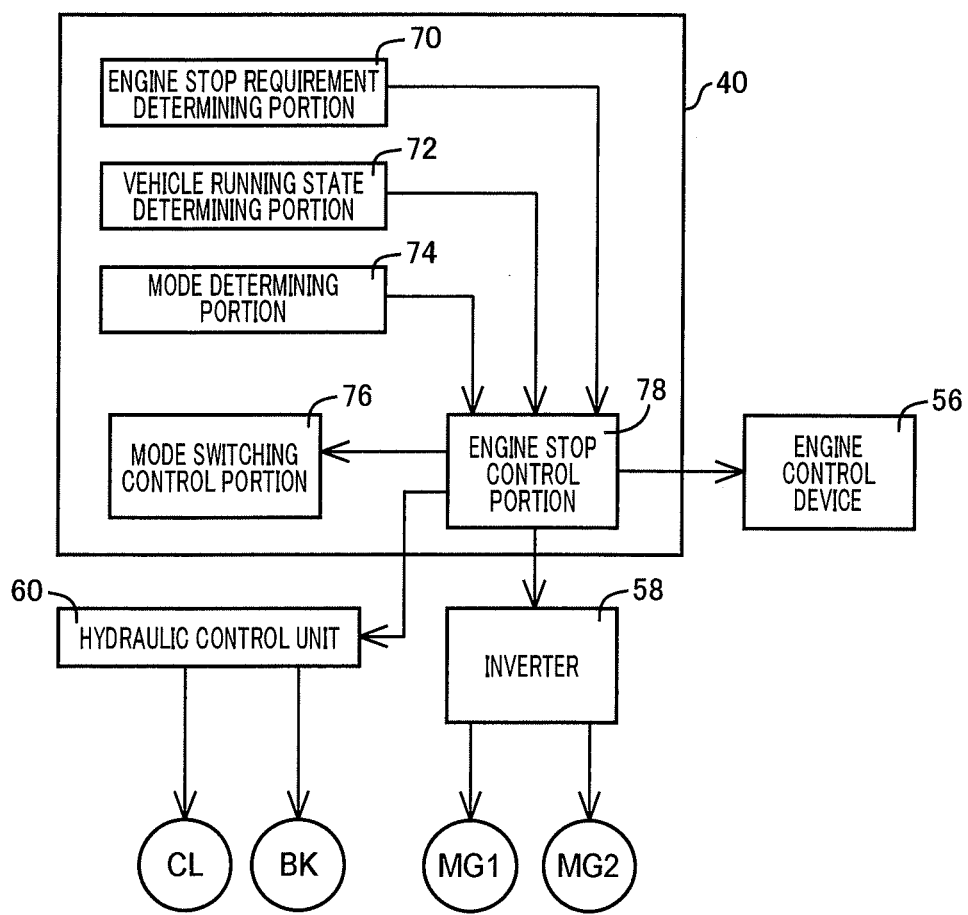
FIG. 8 is a functional block diagram for explaining major control functions of an electronic control device of FIG. 2.

FIG. 8 is the functional block diagram for explaining major control functions of the electronic control device 40 of FIG. 2. An engine stop requirement determining portion 70 shown in FIG. 8 is configured to determine whether the engine 12 which has been kept in an operated state (under the control of the engine control device 56) is required to be stopped. For instance, the engine stop requirement determining portion 70 determines that the engine 12 is required to be stopped, if a running state of the hybrid vehicle falls within a motor drive region, as a result of a decrease of a required vehicle drive force represented by the accelerator pedal operation amount and the vehicle running speed, below a predetermined lower limit, if the stored electric energy amount SOC of an electric-energy storage device not shown has exceeded a charging upper limit and charging is restricted, or if a motor drive mode selector device is operated to a motor drive position. A vehicle running state determining portion 72 is configured to determine whether the hybrid vehicle is in a coasting run, or in a positive driving run (an accelerating run). For instance, this determination is made depending upon whether the required vehicle drive force obtained on the basis of the vehicle running speed and the accelerator pedal operation amount is a positive value or a negative value, or whether the accelerator pedal or a brake pedal is placed in an operated state. A mode determining portion 74 is configured to determine a presently established one of the five modes consisting of the EV-1, EV-2, HV-1, HV-2 and HV-3 modes, on the basis of vehicle parameters such as the vehicle running speed V, the accelerator pedal operation amount $A_{CC}$, the stored electric energy amount SOC and operating temperatures, or on the basis of output states of the engine control device 56 and the inverter 58, an output sate of a mode switching control portion 76, or an already set state of an appropriate memory flag.

The mode switching control portion 76 is configured to implement a mode switching control for placing the drive system 10 in the selected one of the drive modes. For instance, the mode switching control portion 76 determines whether the drive system 10 should be placed in an electric drive mode or a hybrid drive mode, depending upon whether the operator's required vehicle drive force represented by the vehicle running speed V and the accelerator pedal operation amount $A_{CC}$ lies in a predetermined electric drive region or an engine drive region, or on the basis of a requirement based on the stored electric energy amount SOC. If the electric drive mode is selected or required, the mode switching control portion 76 establishes one of the drive EV-1 and EV-2 modes, on the basis of the requirement based on the stored electric energy amount SOC and the operator's selection. If the hybrid drive mode is selected or required, the mode switching control portion 76 establishes one of the HV-1, HV-2 and HV-3 modes, on the basis of the operating efficiency of the engine 12, the transmission efficiency, the required vehicle drive force, etc., so as to provide a good compromise between the vehicle drivability and the fuel economy. For example, the mode switching control portion 76 establishes the HV-1 mode at a relatively low running speed in a relatively low-gear (high speed-reduction ratio range), the HV-2 mode at a relatively intermediate running speed in a relatively intermediate-gear (intermediate speed-reduction ratio range), or at a relatively high running speed in a relatively high-gear (low speed-reduction ratio range). This mode switching control portion 76 releases the clutch CL and engages the brake BK through the hydraulic control unit 60, for switching the drive mode from the HV-2 mode to the HV-1 mode. Namely, the mode switching control portion 76 switches the operating state from the state shown in the collinear chart of FIG. 6 to the state shown in the collinear chart of FIG. 4.

An engine stop control portion 78 is configured to command the engine control device 56 to stop a fuel supply by a fuel injecting device into an intake pipe, and an ignition control by an igniting device, for thereby stopping the operation of the engine 12, so that reduction of the engine speed $N_E$ is initiated, when the engine stop requirement determining portion 70 determines that the engine is required to be stopped during running of the hybrid vehicle in a first engine drive mode in the form of the HV-1 mode in which the clutch CL is placed in the released state while the brake BK is placed in the engaged state. At the same time, the engine stop control portion 78 commands the first electric motor MG1 to reduce the engine speed $N_E$ such that the engine speed $N_E$ rapidly drops through a resonance band, so that the drive mode is switched to the EV-1 mode. As a result, the reaction force generated to reduce the engine speed $N_E$ is cancelled by a torque generated by the second electric motor MG2 operatively connected to the output gear 30, in order to prevent a change of the vehicle drive force.

When the engine stop requirement determining portion 70 determines that the engine is required to be stopped while running of the hybrid vehicle in a second engine drive mode in the form of the HV-2 mode in which the clutch CL is placed in the engaged state while the brake BK is placed in the released state, is detected by the mode determining portion 74, the engine stop control portion 78 stops the operation of the engine 12, and reduces the engine speed $N_E$ with the first electric motor MG1 such that the engine speed $N_E$ rapidly drops through the resonance band, as in the case of running of the hybrid vehicle in the HV-1 mode. In the HV-2 mode, however, the second electric motor MG2 is not connected to the output gear 30 but is connected to the rotary element S2, so that a drive force of the second electric motor MG2 cannot be transmitted directly to the output gear 30. Therefore, it is difficult for the second electric motor MG2 to cancel an influence of the reaction force generated to stop a rotary motion of the engine, which influence would exert on the vehicle drive force. Accordingly, the engine stop control portion 78 controls the first and second electric motors MG1 and MG2 so as to generate torques in respective opposite directions, for reducing the speed $N_E$ of the engine 12 such that an influence of the reaction torque generated to stop the rotary motion of the engine 12 will not exert on the drive wheels of the hybrid vehicle, thereby preventing a variation of the vehicle drive force and a shock due to stopping of the engine 12. When the speed $N_E$ of the engine 12 has been zeroed, the brake BK is brought into the engaged state, to switch the vehicle drive mode to the EV drive mode in the form of the EV-1 or EV-2 mode.

Figure 9:
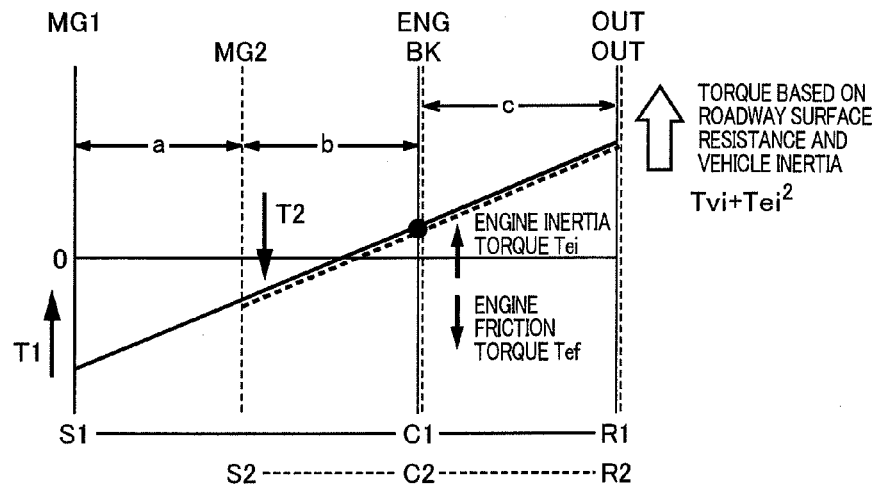
FIG. 9 is a collinear chart for explaining an engine stop control implemented by an engine stop control portion of FIG. 8 during a coasting run of the hybrid vehicle.
Figure 10:
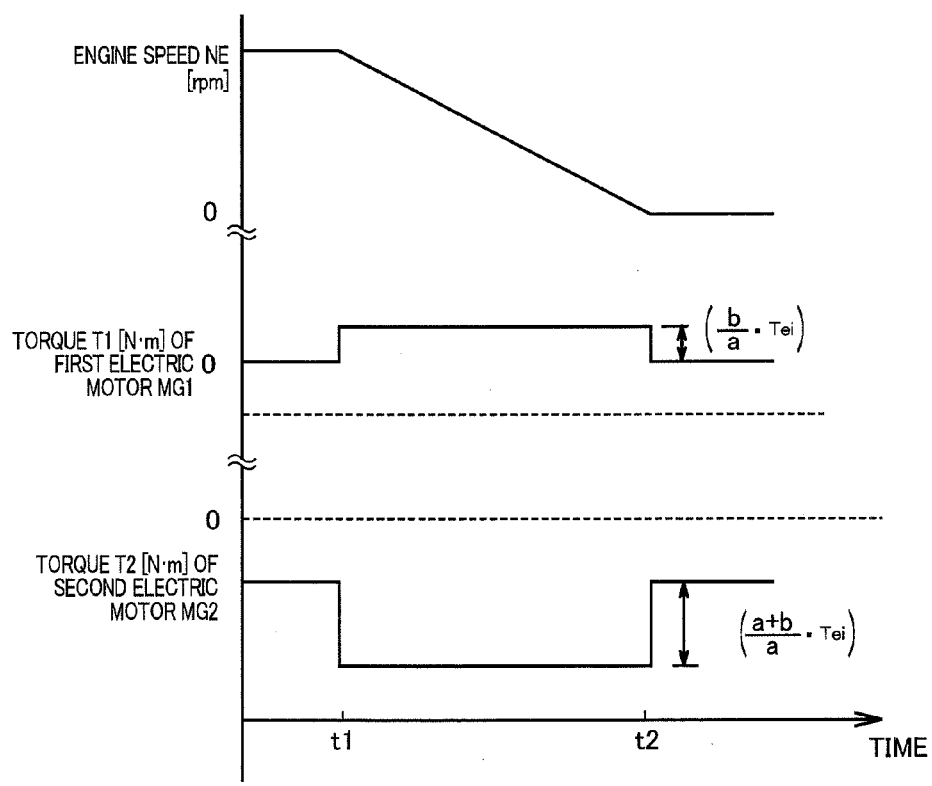
FIG. 10 is a timing chart for explaining the engine stop control implemented by the engine stop control portion of FIG. 8 during the coating run of the hybrid vehicle.

When the vehicle running state determining portion 72 determines that the hybrid vehicle is in a coasting run, the engine stop control portion 78 controls the first electric motor MG1 to generate a torque in a positive direction and controls the second electric motor MG2 to generate a torque in a negative direction such that the torques of the first and second electric motors MG1 and MG2 are increased as compared with those prior to initiation of an engine stop control, while the speed $N_E$ of the engine 12 is rapidly reduced, such that the influence of the reaction torque generated to stop the rotary motion of the engine 12 will not exert on the drive wheels of the hybrid vehicle, namely, in order to prevent a variation of the value of deceleration of the hybrid vehicle in the coasting run, which deceleration is obtained by a regenerative operation of the second electric motor MG2. FIG. 9 is the collinear chart for explaining the engine stop control implemented during a coasting run of the hybrid vehicle, while FIG. 10 is the timing chart.

A torque T1 of the first electric motor MG1 and a torque T2 of the second electric motor MG2 corresponding to a given value of deceleration of the hybrid vehicle in the coasting run are respectively represented by the following equations (1) and (2) which include a torque Tvi based on an inertia of the hybrid vehicle and an engine friction torque Tef, and in which "a", "b" and "c" represent distances among the four rotary elements indicated in the collinear chart of FIG. 9. Further, conditions of the torques during the engine stop control in the coasting run are represented by the following equations (3) and (4) including an engine inertia torque Tei and an engine stop control reaction torque Tei' acting on the output gear 30. Accordingly, a torque T1' of the first electric motor MG1 and a torque T2' of the second electric motor MG2 during the engine stop control in the coasting run are respectively represented by the following equations (5) and (6).

$$T1=Tvi(b+c)/a-Tef(b/a) \tag{1}$$

$$T2=Tvi(a+b+c)/a-Tef(a+b/a) \tag{2}$$

$$Tei+Tei'+Tvi+T1'=T2'+Tef \tag{3}$$

$$Tei'=0 \tag{4}$$

$$T1'=T1+Tei(b/a) \tag{5}$$

$$T2'=T2+Tei(a+b)/a \tag{6}$$

Therefore, the torque T1 of the first electric motor MG1 and the torque T2 of the second electric motor MG2 are respectively increased (in the absolute values) by Tei (b/a) and Tei (a+b)/a during the engine stop control in the coasting run from a point of time t1 to a point of time t2, as indicated in FIG. 10, so that the reaction torque Tei' acting on the output gear 30 during the engine stop control is canceled.

Figure 11:
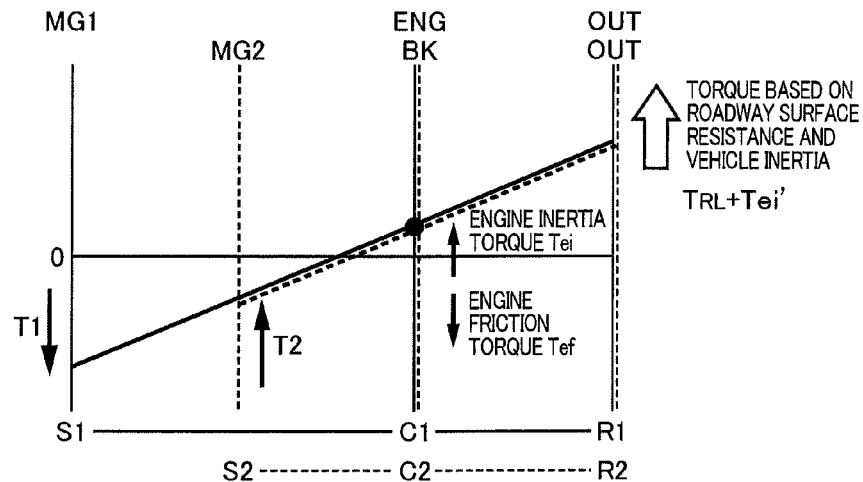
FIG. 11 is a collinear chart for explaining an engine stop control implemented by the engine stop control portion of FIG. 8 during an accelerating run of the hybrid vehicle.
Figure 12:
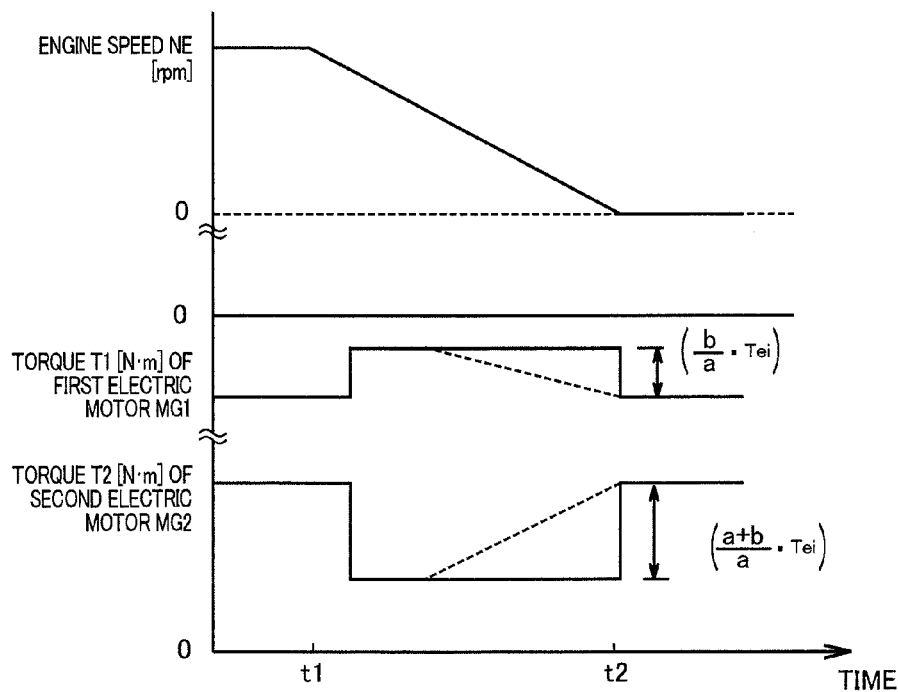
FIG. 12 is a timing chart for explaining the engine stop control implemented by the engine stop control portion of FIG. 8 during the accelerating run of the hybrid vehicle.

When the vehicle running state determining portion 72 determines that the hybrid vehicle is in an accelerating run (in a positive driving run), the engine stop control portion 78 controls the first electric motor MG1 to generate a torque in a negative direction, and controls the second electric motor MG2 to generate a torque in a positive direction, namely, in the directions reversed with respect to those in the coasting run, such that the torques of the first and second electric motors MG1 and MG2 are reduced as compared with those prior to initiation of the engine stop control, while the speed $N_E$ of the engine 12 is rapidly reduced, such that the influence of the reaction torque generated to stop the rotary motion of the engine 12 will not exert on the drive wheels of the hybrid vehicle, namely, in order to prevent a variation of the value of acceleration of the hybrid vehicle in the positive driving run. FIG. 11 is the collinear chart for explaining the engine stop control implemented during an accelerating run of the hybrid vehicle, while FIG. 12 is the timing chart.

A torque T3 of the first electric motor MG1 and a torque T4 of the second electric motor MG2 corresponding to a given value of acceleration of the hybrid vehicle in the positive driving run are respectively represented by the following equations (7) and (8) which include a torque Trl based on a roadway surface resistance and an inertia of the hybrid vehicle, as indicated in FIG. 11. Further, conditions of the torques during the engine stop control in the positive driving run are represented by the following equations (9) and (10). Accordingly, the torque T1' of the first electric motor MG1 and the torque T2' of the second electric motor MG2 during the engine stop control in the positive driving run are respectively represented by the following equations (11) and (12).

$$T3=Trl(b+c)/a+Tef(b/a) \tag{7}$$

$$T4=Trl(a+b+c)/a+Tef(a+b/a) \tag{8}$$

$$Tei+Tei'+T4'=T3'+Tef+Trl \tag{9}$$

$$Tei'=0 \tag{10}$$

$$T3'=T3-Tei(b/a) \tag{11}$$

$$T4'=T4-Tei(a+b)/a \tag{12}$$

Therefore, the torque T1 of the first electric motor MG1 and the torque T2 of the second electric motor MG2 are respectively reduced (in the absolute values) by Tei (b/a) and Tei (a+b)/a during the engine stop control in the positive driving run from the point of time t1 to the point of time t2, as indicated in FIG. 12, so that the reaction torque Tei' acting on the output gear 30 during the engine stop control is canceled.

During the engine stop control in the positive driving run, the engine stop control portion 78 controls the second electric motor MG2 so as to reduce its torque while an engaging torque of the brake BK is increased, preferably, so as to reduce its torque with an increase of a torque capacity of the brake BK, as indicated by a broken line in FIG. 12, and so as to switch the direction of the torque from the positive direction to the negative direction at a moment of engagement in a terminal portion of an engaging action of the brake BK, for permitting the hybrid vehicle to run in a first motor drive mode in the form of the EV-1 mode or in a second motor drive mode in the form of the EV-2 mode. Although this moment of reversal of the direction in relation to the engaging action of the brake BK may be detected by determining whether the rotating speed of the carrier C2 calculated on the basis of the rotating speed of the output gear 30 (vehicle running speed) and the operating speed of the second electric motor MG2 has been zeroed, the moment of reversal may be detected at an earlier point of time by determining whether an engaging hydraulic pressure of the brake BK has exceeded a predetermined value. For example, the moment of reversal in relation to the engaging action of the brake BK is preferably determined before the engine speed $N_E$ has been zeroed, on the basis of the required vehicle drive force calculated from the actual accelerator pedal operation amount $A_{CC}$ and the vehicle running speed V ($N_{OUT}$) and according to a predetermined relationship, such that a length of time from the moment of reversal to the moment of zeroing of the engine speed $N_E$ decreases with an increase of the required vehicle drive force.

Figure 13:
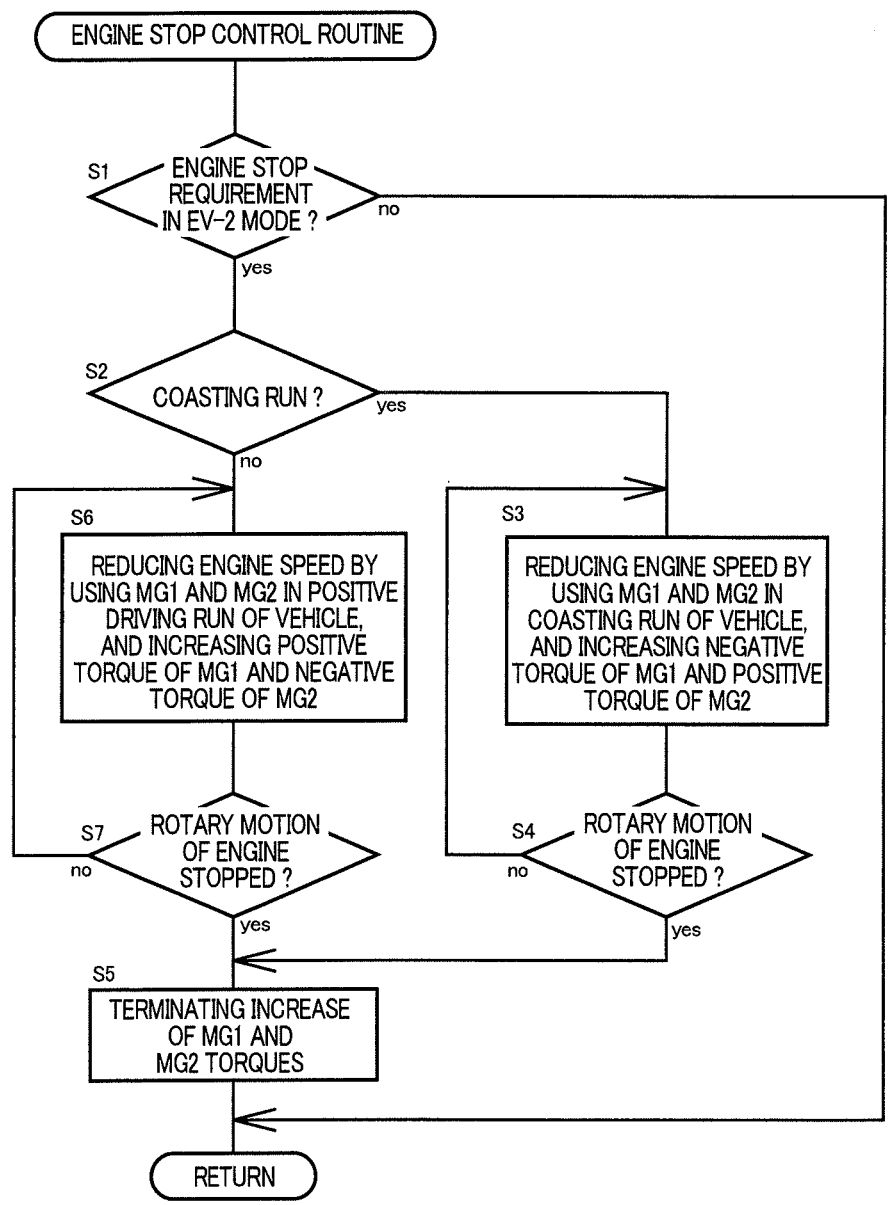
FIG. 13 is a flow chart for explaining a major portion of the engine stop control implemented by the electronic control device provided for the drive system of FIG. 1.
Figure 14:
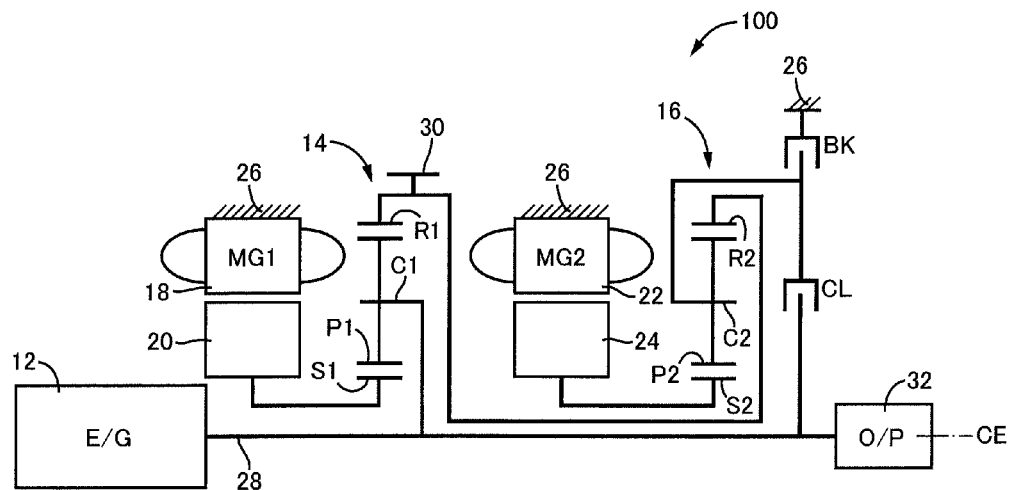
FIG. 14 is a schematic view for explaining an arrangement of a hybrid vehicle drive system according to another preferred embodiment of this invention.
Figure 15:
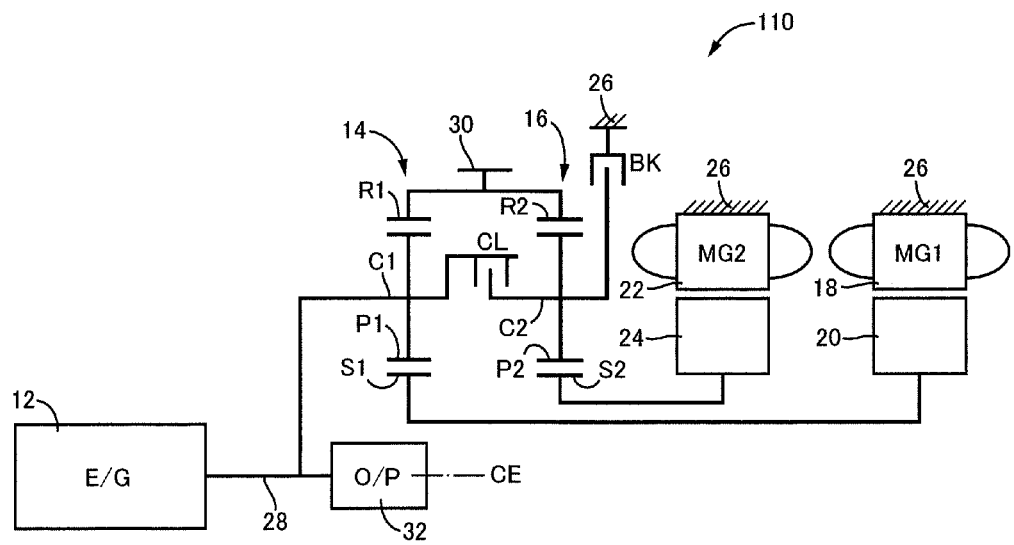
FIG. 15 is a schematic view for explaining an arrangement of a hybrid vehicle drive system according to a further preferred embodiment of this invention.
Figure 16:
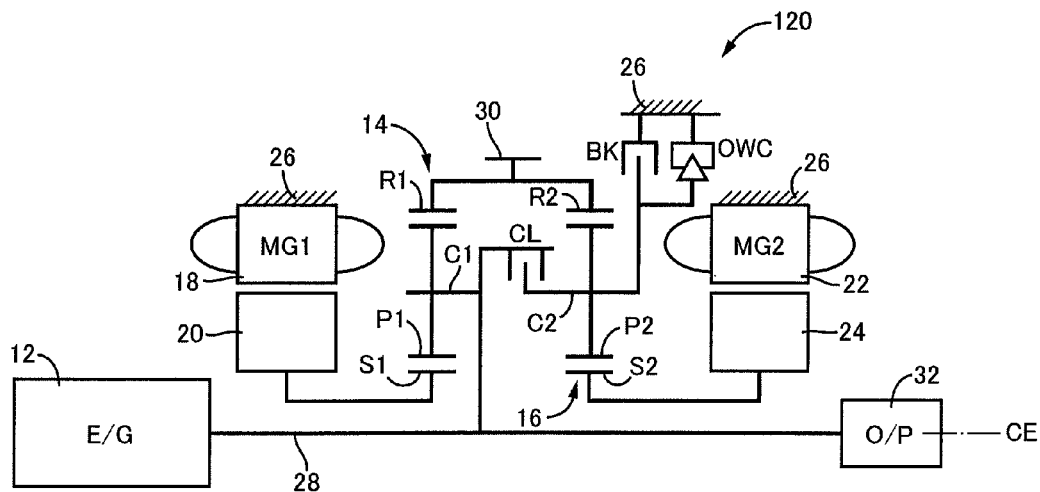
FIG. 16 is a schematic view for explaining an arrangement of a hybrid vehicle drive system according to a still further preferred embodiment of this invention.
Figure 17:
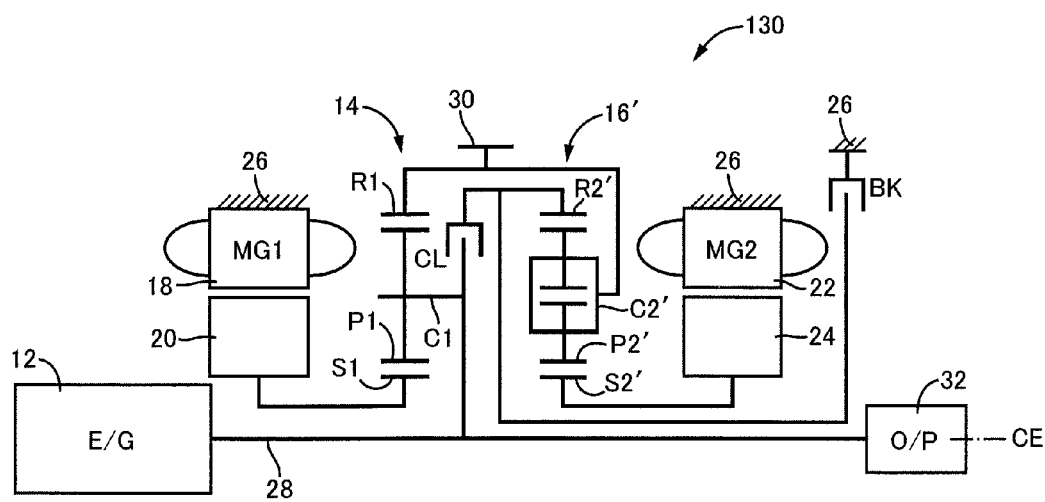
FIG. 17 is a schematic view for explaining an arrangement of a hybrid vehicle drive system according to a yet further preferred embodiment of this invention.
Figure 18:
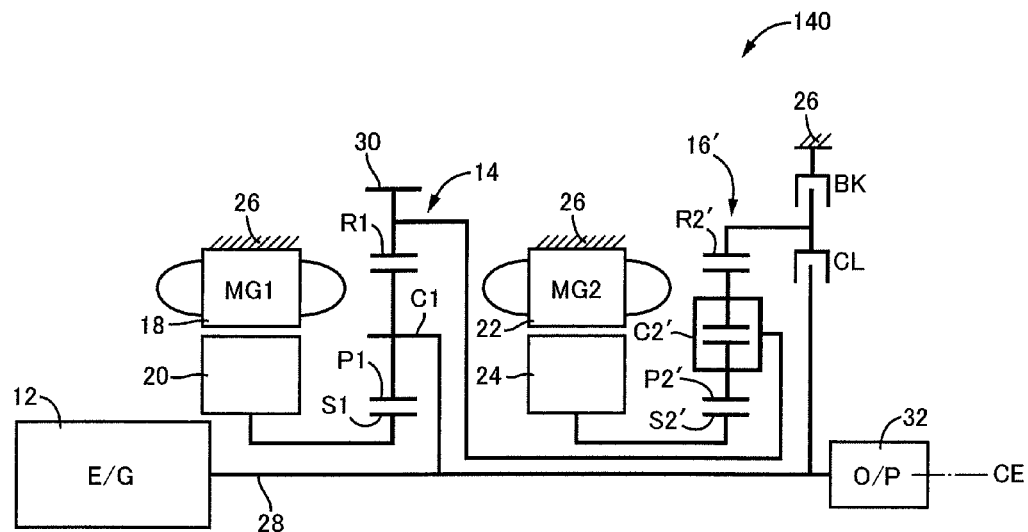
FIG. 18 is a schematic view for explaining an arrangement of a hybrid vehicle drive system according to still another preferred embodiment of this invention.
Figure 19:
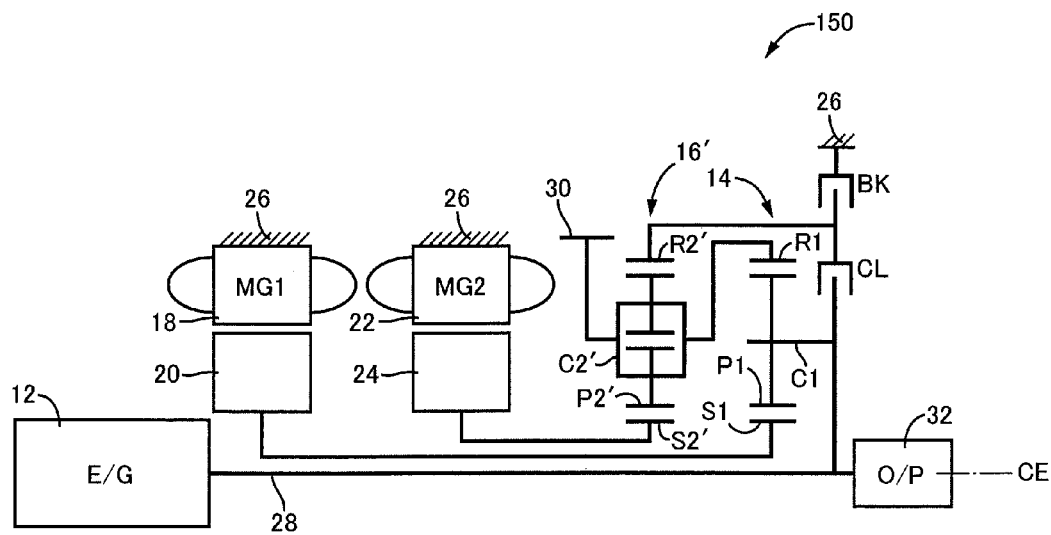
FIG. 19 is a schematic view for explaining an arrangement of a hybrid vehicle drive system according to yet another preferred embodiment of this invention.

FIG. 13 is the flow chart for explaining a major portion of a control operation of the electronic control device 40 of FIG. 2. The control operation is repeatedly performed with a predetermined cycle time.

The control operation is initiated with a step S1 ("step" being hereinafter omitted) corresponding to the engine stop requirement determining portion 70, to determine whether the engine is required to be stopped during running of the hybrid vehicle in the engine drive mode in the form of the EV-2 mode. If a negative determination is obtained in S1, the present routine is terminated. If an affirmative determination is obtained in S1, on the other hand, the control flow goes to S2 corresponding to the vehicle running state determining portion 72, to determine whether the hybrid vehicle is in a coasting run, for instance. If an affirmative determination is obtained in S2, namely, if the hybrid vehicle is in a coasting run, the control flow goes to S3 corresponding to the engine stop control portion 78, to implement the engine stop control in the coasting run, until an affirmative determination that the engine speed $N_E$ has been zeroed is obtained in S4. In S3, the operation of the engine 12 is stopped, and the first electric motor MG1 is controlled to generate a torque in the positive direction, while the second electric motor MG2 is controlled to generate a torque in the negative direction. Namely, the torques of the first and second electric motors MG1 and MG2 are increased (in the absolute value) as compared with those prior to initiation of the engine stop control, while the speed $N_E$ of the engine 12 is rapidly reduced, so that an influence of the reaction torque generated to stop the rotary motion of the engine 12 will not exert on the drive wheels. If the affirmative determination is obtained in S4, the control flow goes to S5 to terminate the engine stop control in S3, and bring the brake BK into the engaged state, so that the vehicle drive mode is switched to the motor drive mode in the form of the EV-2 mode or EV-1 mode.

If the hybrid vehicle is running in an accelerating run (positive driving run), namely, if a negative determination is obtained in S2, the control flow goes to S6 corresponding to the engine stop control portion 78, to implement the engine stop control in the accelerating run (positive driving run), until an affirmative determination that the engine speed $N_E$ has been zeroed is obtained in S7. In S6, the operation of the engine 12 is stopped, and the first electric motor MG1 is controlled to generate a torque in the positive direction, while the second electric motor MG2 is controlled to generate a torque in the negative direction. Namely, the torques of the first and second electric motors MG1 and MG2 are reduced (in the absolute value) as compared with those prior to initiation of the engine stop control, while the speed $N_E$ of the engine 12 is rapidly reduced, so that an influence of the reaction torque generated to stop the rotary motion of the engine 12 will not exert on the drive wheels. If the affirmative determination is obtained in S7, the control flow goes to S5 to terminate the engine stop control in S3, and bring the brake BK into the engaged state, so that the vehicle drive mode is switched to the motor drive mode in the form of the EV-2 mode or EV-1 mode.

The hybrid vehicle drive control device of the present embodiment is configured to control the first and second electric motors MG1 and MG2 so as to generate torques in the respective opposite directions when the engine is required to be stopped during running of the hybrid vehicle in the engine drive mode in the form of the HV-2 mode in which the clutch CL is placed in the engaged state. Accordingly, it is possible to prevent an influence of the reaction torque generated to stop the rotary motion of the engine, which influence would exert on the drive wheels of the hybrid vehicle, when the engine is stopped during running of the hybrid vehicle in the engine drive mode in which the clutch CL is placed in the engaged state. Thus, it is possible to effectively prevent a variation of the vehicle drive force and a shock due to stopping of the rotary motion of the engine. Namely, it is possible to prevent an unintended increase of the vehicle drive torque upon stopping of the engine 12 during running of the hybrid vehicle in the engine drive mode in the form of the HV-2 mode.

The present hybrid vehicle drive control device is further configured such that the directions of the torques generated by the first and second electric motors MG1 and MG2 while the hybrid vehicle is in a coasting run are reversed with respect to those generated while the hybrid vehicle is in a positive driving run. Accordingly, the hybrid vehicle in the coasting run can be decelerated with a regenerative operation of the second electric motor MG2, while the hybrid vehicle in the positive driving run can be accelerated with a torque of the engine 12 generated with a regenerative operation of the first electric motor MG1, and the positive torque of the second electric motor MG2.

The present hybrid vehicle drive control device is also configured to control the first electric motor MG1 to generate the torque in a positive direction, and to control the second electric motor MG2 to generate the torque in a negative direction, while the hybrid vehicle is in the coasting run. Accordingly, the hybrid vehicle in the coasting run can be decelerated with the regenerative operation of the second electric motor MG2.

The present hybrid vehicle drive control device is further configured to control the first electric motor MG1 to generate the torque in a negative direction, and to control the second electric motor MG2 to generate the torque in a positive direction, while the hybrid vehicle is in the positive driving run. Accordingly, the hybrid vehicle in the positive driving run can be accelerated with the torque of the engine 12 generated with the regenerative operation of the first electric motor MG1, and the positive torque of the second electric motor MG2.

The present hybrid vehicle drive control device is further configured to control the torque of the first electric motor MG1 and the torque of the second electric motor MG2 so as to prevent a variation of a drive force of the hybrid vehicle during running due to a reaction force generated to stop a rotary motion of the engine. Accordingly, it is possible to prevent an influence of the reaction force generated to stop the rotary motion of the engine 12, which influence would exert on the drive wheels of the hybrid vehicle. Thus, it is possible to effectively prevent a variation of the vehicle drive force or a shock due to stopping of the rotary motion of the engine 12, in the coasting run or positive driving run of the hybrid vehicle.

The present hybrid vehicle drive control device is also configured to increase the torque capacity of the brake BK to switch the vehicle drive mode to the motor drive mode in which the brake BK is placed in the engaged state, and to reduce the torque of the second electric motor MG2 with an increase of the torque capacity of the brake BK. Accordingly, it is possible to smoothly stop the rotary motion of the engine 12 without reduction of the vehicle drive force in the terminal portion of the engaging action of the brake BK, and to reduce a shock upon reversal of the direction of the torque of the second electric motor MG2 during the engaging action of the brake BK.

The present hybrid vehicle drive control device is further configured to reverse the direction of the torque of the second electric motor MG2 when the torque capacity of the brake BK has increased to a predetermined value. Accordingly, the vehicle drive force can be generated at an earlier point of time or more smoothly, than where the direction of the torque of the second electric motor MG2 is reversed when the engine speed $N_E$ has been zeroed.

The present hybrid vehicle drive control device is also configured to implement the reversal of the direction of the torque of the second electric motor MG2 at an earlier point of time when the required vehicle drive force is relatively large when the required vehicle drive force is relatively small. Accordingly, it is possible to assure not only reduction of a variation of the vehicle drive force or a shock due to the reaction force generated to stop the rotary motion of the engine 12, but also an improvement of a response of the vehicle drive force.

Other preferred embodiments of the present invention will be described in detail by reference to the drawings. In the following description, the same reference signs will be used to identify the same elements in the different embodiments, which will not be described redundantly.

Second Embodiment

FIGS. 14-19 are the schematic views for explaining arrangements of respective hybrid vehicle drive systems 100, 110, 120, 130, 140 and 150 according to other preferred modes of this invention used instead of the hybrid vehicle drive system 10 of the previous embodiment. The hybrid vehicle drive control device of the present invention is also applicable to drive systems such as the drive system 100 shown in FIG. 14 and the drive system 110 shown in FIG. 15, which have respective different arrangements of the first electric motor MG1, first planetary gear set 14, second electric motor MG2, second planetary gear set 16, clutch CL and brake BK in the direction of the center axis CE. The present hybrid vehicle drive control device is also applicable to drive systems such as the drive system 120 shown in FIG. 16, which have a one-way clutch OWC disposed between the carrier C2 of the second planetary gear set 16 and the stationary member in the form of the housing 26, in parallel with the brake BK, such that the one-way clutch OWC permits a rotary motion of the carrier C2 relative to the housing 26 in one of opposite directions and inhibits a rotary motion of the carrier C2 in the other direction. The present hybrid vehicle drive control device is further applicable to drive systems such as the drive system 130 shown in FIG. 17, the drive system 140 shown in FIG. 18 and the drive system 150 shown in FIG. 19, which are provided with a second differential mechanism in the form of a second planetary gear set 16' of a double-pinion type, in place of the second planetary gear set 16 of a single-pinion type. This second planetary gear set 16' is provided with rotary elements (elements) consisting of: a first rotary element in the form of a sun gear S2'; a second rotary element in the form of a carrier C2' supporting a plurality of pinion gears P2' meshing with each other such that each pinion gear P2' is rotatable about its axis and the axis of the planetary gear set; and a third rotary element in the form of a ring gear R2' meshing with the sun gear S2' through the pinion gears P2'.

Each of the hybrid vehicle drive systems 100, 110, 120, 130, 140 and 150 according to the present second embodiment is provided with: a first differential mechanism in the form of the first planetary gear set 14 having a first rotary element in the form of the sun gear S1 connected to the first electric motor MG1, a second rotary element in the form of the carrier C1 connected to the engine 12, and a third rotary element in the form of the ring gear R1 connected to a output rotary member in the form of the output gear 30; a second differential mechanism in the form of the second planetary gear set 16 (16') having a first rotary element in the form of the sun gear S2 (S2') connected to the second electric motor MG2, a second rotary element in the form of the carrier C2 (C2') and a third rotary element in the form of the ring gear R2 (R2'), one of the carrier C2 (C2') and the ring gear R2 (R2') being connected to the ring gear R1 of the first planetary gear set 14; the clutch CL for selectively connecting the carrier C1 of the first planetary gear set 14 and the other of the carrier C2 (C2') and the ring gear R2 (R2') which is not connected to the ring gear R1, to each other; and the brake BK for selectively connecting the other of the carrier C2 (C2') and the ring gear R2 (R2') which is not connected to the ring gear R1, to a stationary member in the form of the housing 26. Accordingly, the electronic control device 40 applied to the present second embodiment wherein the first planetary gear set 14 and the second planetary gear set 16 (16') as a whole have four rotary elements represented in the collinear chart has the same advantages as the first embodiment described above. Namely, the first and second electric motors MG1 and MG2 are controlled so as to generate torques in the respective opposite directions when the engine is required to be stopped during running of the hybrid vehicle in the engine drive mode in the form of the HV-2 mode, for instance, in which the clutch CL is placed in the engaged state. Accordingly, it is possible to prevent an influence of the reaction torque generated to stop the rotary motion of the engine, which influence would exert on the drive wheels of the hybrid vehicle, when the engine is stopped during running of the hybrid vehicle in the engine drive mode in which the clutch CL is placed in the engaged state. Thus, it is possible to effectively prevent a variation of the vehicle drive force and a shock due to stopping of the rotary motion of the engine.

Third Embodiment

Figure 20:
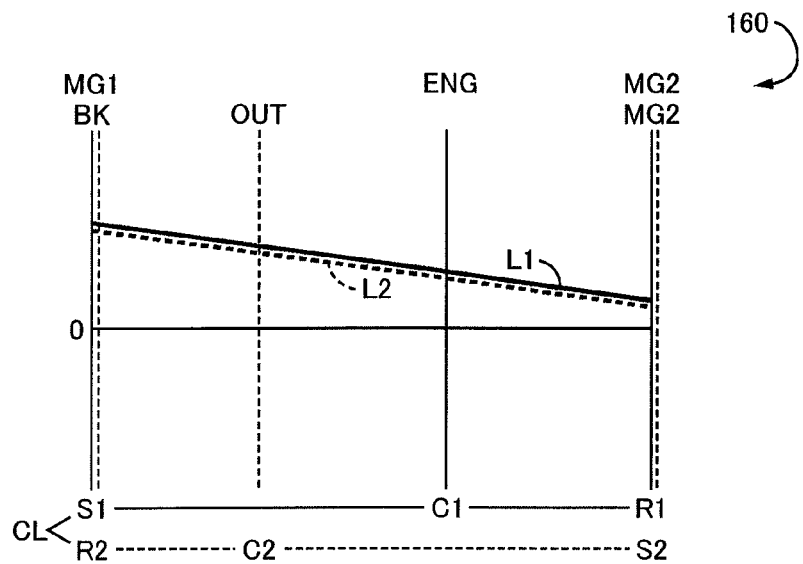
FIG. 20 is a collinear chart for explaining an arrangement and an operation of a hybrid vehicle drive system according to another preferred embodiment of this invention.
Figure 21:
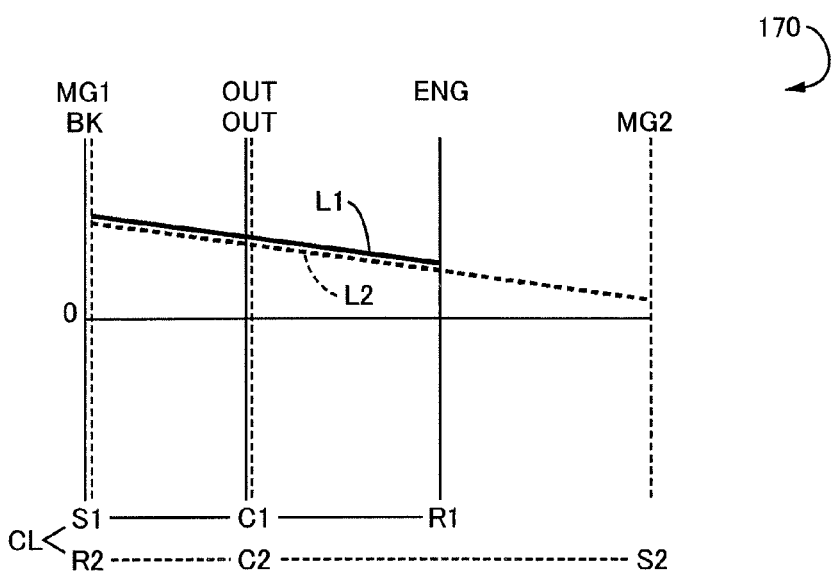
FIG. 21 is a collinear chart for explaining an arrangement and an operation of a hybrid vehicle drive system according to a further preferred embodiment of this invention.
Figure 22:
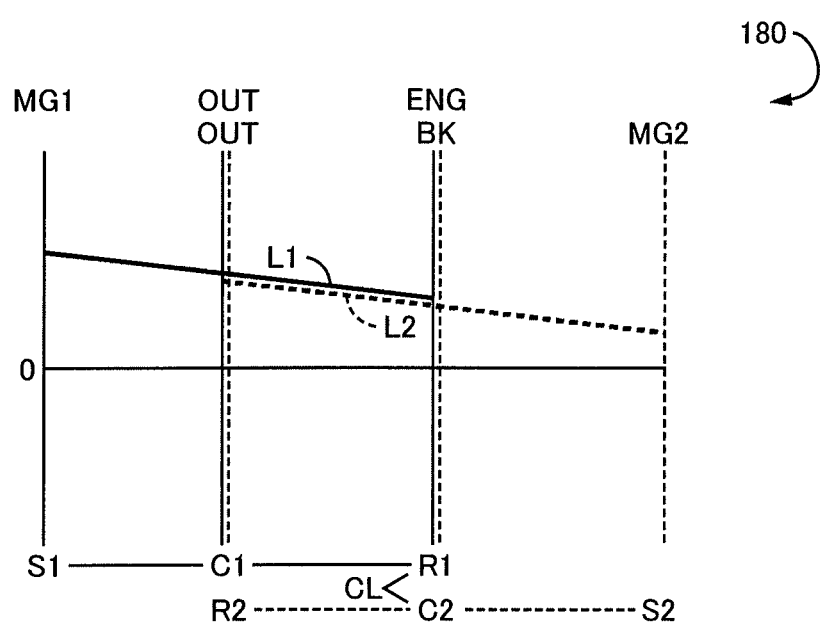
FIG. 22 is a collinear chart for explaining an arrangement and an operation of a hybrid vehicle drive system according to a still further preferred embodiment of this invention.

FIGS. 20-22 are the collinear charts for explaining arrangements and operations of respective hybrid vehicle drive systems 160, 170 and 180 according to other preferred modes of this invention in place of the drive system 10. In FIGS. 20-22, the relative rotating speeds of the sun gear S1, carrier C1 and ring gear R1 of the first planetary gear set 14 are represented by the solid line L1, while the relative rotating speeds of the sun gear S2, carrier C2 and ring gear R2 of the second planetary gear set 16 are represented by the broken line L2, as in FIGS. 4-7. In the drive system 160 for the hybrid vehicle, the sun gear S1, carrier C1 and ring gear R1 of the first planetary gear set 14 are respectively connected to the first electric motor MG1, engine 12 and second electric motor MG2, while the sun gear S2, carrier C2 and ring gear R2 of the second planetary gear set 16 are respectively connected to the second electric motor MG2 and output gear 30, and to the housing 26 through the brake BK. The sun gear S1 and the ring gear R2 are selectively connected to each other through the clutch CL. In the drive system 170 for the hybrid vehicle, the sun gear S1, carrier C1 and ring gear R1 of the first planetary gear set 14 are respectively connected to the first electric motor MG1, output gear 30 and engine 12, while the sun gear S2, carrier C2 and ring gear R2 of the second planetary gear set 16 are respectively connected to the second electric motor MG2 and output gear 30, and to the housing 26 through the brake BK. The sun gear S1 and the ring gear R2 are selectively connected to each other through the clutch CL. In the drive system 180 for the hybrid vehicle, the sun gear S1, carrier C1 and ring gear R1 of the first planetary gear set 14 are respectively connected to the first electric motor MG1, output gear 30 and engine 12, while the sun gear S2, carrier C2 and ring gear R2 of the second planetary gear set 16 are respectively connected to the second electric motor MG2, to the housing 26 through the brake BK, and to the output gear 30. The ring gear R1 and the carrier C2 are selectively connected to each other through the clutch CL.

The electronic control device 40 applied to the present second embodiment of FIGS. 20-22, as the embodiment illustrated in FIG. 4-7, wherein the first planetary gear set 14 and the second planetary gear set 16 (16') as a whole have four rotary elements represented in the collinear chart has the same advantages as the first embodiment described above. Namely, the first and second electric motors MG1 and MG2 are controlled so as to generate torques in the respective opposite directions when the engine is required to be stopped during running of the hybrid vehicle in the engine drive mode in the form of the HV-2 mode, for instance, in which the clutch CL is placed in the engaged state. Accordingly, it is possible to prevent an influence of the reaction torque generated to stop the rotary motion of the engine, which influence would exert on the drive wheels of the hybrid vehicle, when the engine is stopped during running of the hybrid vehicle in the engine drive mode in which the clutch CL is placed in the engaged state. Thus, it is possible to effectively prevent a variation of the vehicle drive force and a shock due to reduction of the engine speed $N_E$.

The drive systems for the hybrid vehicle shown in FIGS. 1, 4-7, 14-19 and 20-22 are identical with each other in that each of these drive systems for the hybrid vehicle is provided with the first differential mechanism (first planetary gear set 14) and the second differential mechanism (second planetary gear set 16, 16') as a whole have four rotary elements represented in the collinear chart, and is further provided with the first electric motor MG1, second electric motor MG2, engine 12 and output rotary member (output gear 30) which are connected to the respective four rotary elements, and the brake BK for selectively fixing the rotary element connected to the engine 12, to the stationary member. In these drive systems for the hybrid vehicle, one of the four rotary elements is constituted by the rotary element of the first differential mechanism (first planetary gear set 14) and the rotary element of the second differential mechanism (second planetary gear set 16, 16') which are selectively connected to each other through the clutch CL, and the motor drive modes in which the first and second electric motors MG1 and MG2 are operated to drive the hybrid vehicle are established by placing the brake BK and the clutch CL in the engaged state.

While the preferred embodiments of this invention have been described by reference to the drawings, it is to be understood that the invention is not limited to the details of the illustrated embodiments, but may be embodied with various changes which may occur without departing from the spirit of the invention.

NOMENCLATURE OF REFERENCE SIGNS 10, 100, 110, 120, 130, 140, 150, 160, 170, 180: Hybrid vehicle drive system
12: Engine
14: First planetary gear set (First differential mechanism)
16, 16': Second planetary gear set (Second differential mechanism)
18, 22: Stator
20, 24: Rotor
26: Housing (Stationary member)
28: Input shaft
30: Output gear (Output rotary member)
40: Electronic control device (Drive control device)
70: Engine stop requirement determining portion
72: Vehicle running state determining portion
74: Mode determining portion
76: Mode switching control portion
78: Engine stop control portion
BK: Brake
CL: Clutch
C1, C2, C2': Carrier (Second rotary element)
MG1: First electric motor
MG2: Second electric motor
R1, R2, R2': Ring gear (Third rotary element)
S1, S2, S2': Sun gear (First rotary element)

The invention claimed is:

1. A drive control device for a hybrid vehicle provided with: a differential device which includes a first differential mechanism and a second differential mechanism and which has four rotary elements; and an engine, a first electric motor, a second electric motor and an output rotary member which are respectively connected to said four rotary elements, and wherein one of said four rotary elements is constituted by a rotary component of said first differential mechanism and a rotary component of said second differential mechanism which are selectively connected to each other through a clutch, and one of the rotary components of said first and second differential mechanisms which are selectively connected to each other through said clutch is selectively fixed to a stationary member through a brake, said drive control device comprising:

an engine stop control portion configured to control said first and second electric motors so as to generate torques in respective opposite directions when the engine is required to be stopped during running of the hybrid vehicle in an engine drive mode in which said clutch is placed in an engaged state, said engine stop control portion reversing the directions of the torques generated by said first and second electric motors while the hybrid vehicle is in a coasting run, with respect to those generated while the hybrid vehicle is in a positive driving run, wherein the first differential mechanism is provided with a first rotary element connected to said first electric motor, a second rotary element connected to said engne, and a third rotary element connected to said output rotary member, while said second differential mechanism is provided with a first rotary element connected to said second electric motor, a second rotary element, and a third rotary element, one of the second and third rotary elements of the second differential mechanism being connected to the third rotary element of said first differential mechanism, and wherein said clutch is configured to selectively connect the second rotary element of said first differential mechanism, and the other of the second and third rotary elements of said second differential mechanism which is not connected to the third rotary element of said first differential mechanism, to each other, while said brake is configured to selectively fix the other of the second and third rotor elements of said second differential mechanism which is not connected to the third rotary element of said first differential mechanism, to the stationary member.

2. The drive control device according to claim 1, wherein said engine stop control portion controls said first electric motor to generate the torque in a positive direction, and controls said second electric motor to generate the torque in a negative direction, while the hybrid vehicle is in the coasting run.

3. The drive control device according to claim 1, wherein said engine stop control portion controls said first electric motor to generate the torque in a negative direction, and controls said second electric motor to generate the torque in a positive direction, while the hybrid vehicle is in the positive driving run.

4. The drive control device according to claim 1, wherein said engine stop control portion controls the torque of said first electric motor and the torque of said second electric motor so as to prevent a variation of a drive force of the hybrid vehicle during running due to a reaction force generated to stop a rotary motion of the engine.

* * * * *